(12) United States Patent
Hung et al.

(10) Patent No.: US 8,005,297 B2
(45) Date of Patent: Aug. 23, 2011

(54) METHOD AND APPARATUS FOR ADAPTIVE AND SELF-CALIBRATED SENSOR GREEN CHANNEL GAIN BALANCING

(75) Inventors: Szepo Robert Hung, Carlsbad, CA (US); Ying Xie Noyes, San Diego, CA (US); Hsiang-Tsun Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1128 days.

(21) Appl. No.: 11/470,619

(22) Filed: Sep. 6, 2006

(65) Prior Publication Data

US 2007/0165116 A1     Jul. 19, 2007

Related U.S. Application Data

(60) Provisional application No. 60/760,769, filed on Jan. 19, 2006, provisional application No. 60/759,842, filed on Jan. 18, 2006.

(51) Int. Cl.
*G06K 9/00* (2006.01)
(52) U.S. Cl. ....................................................... 382/167
(58) Field of Classification Search ................... 382/167
See application file for complete search history.

(56) References Cited

U.S. PATENT DOCUMENTS

| | | | |
|---|---|---|---|
| 6,236,433 B1 * | 5/2001 | Acharya et al. | 348/273 |
| 6,366,694 B1 * | 4/2002 | Acharya | 382/167 |
| 6,628,330 B1 * | 9/2003 | Lin | 348/252 |
| 6,970,597 B1 * | 11/2005 | Olding et al. | 382/167 |
| 7,170,529 B2 * | 1/2007 | Chang | 345/604 |
| 7,227,991 B2 * | 6/2007 | Castorina et al. | 382/167 |
| 7,236,191 B2 * | 6/2007 | Kalevo et al. | 348/222.1 |
| 7,369,165 B2 * | 5/2008 | Bosco et al. | 348/272 |
| 7,440,016 B2 | 10/2008 | Keshet et al. | |
| 7,486,844 B2 * | 2/2009 | Chang et al. | 382/300 |
| 7,573,515 B2 * | 8/2009 | Jaspers | 348/272 |
| 2002/0158977 A1 * | 10/2002 | Hamilton, Jr. | 348/246 |
| 2002/0167602 A1 * | 11/2002 | Nguyen | 348/280 |
| 2002/0186309 A1 * | 12/2002 | Keshet et al. | 348/272 |

(Continued)

FOREIGN PATENT DOCUMENTS

EP     1289310 A2     3/2003

(Continued)

OTHER PUBLICATIONS

PCT Search Report, Sep. 13, 2007.

(Continued)

*Primary Examiner* — Samir A Ahmed
*Assistant Examiner* — Jayesh Patel
(74) *Attorney, Agent, or Firm* — George C. Pappas; James R. Gambale, Jr.

(57) ABSTRACT

A method and apparatus for adaptive green channel odd-even mismatch removal to effectuate the disappearance of artifacts caused by the odd-even mismatch in a demosaic processed image. In one example, a calibrated GR channel gain for red rows and a calibrated GB channel gain for blue rows are determined and are a function of valid pixels only in each respective region. After the calibration, in a correction process, the green pixels in red rows of a region are multiplied by the calibrated GR channel gain, and the green pixels in blue rows are multiplied by the calibrated GB channel gain.

24 Claims, 33 Drawing Sheets

U.S. PATENT DOCUMENTS

2003/0197796 A1* 10/2003 Taubman .................. 348/272
2004/0075755 A1* 4/2004 Rantanen et al. ........ 348/231.99
2005/0200733 A1* 9/2005 Malvar .................. 348/272

FOREIGN PATENT DOCUMENTS

| EP | 1289310 A3 * | 3/2003 |
|---|---|---|
| JP | 2002142149 A | 5/2002 |
| JP | 2004534429 T | 11/2004 |
| WO | 02075654 A2 | 9/2002 |
| WO | WO 02075654 A2 * | 9/2002 |

OTHER PUBLICATIONS

Written Opinion—PCT/US2007/060651, International Search Authority, European Patent Office, Sep. 13, 2007.

* cited by examiner

10

A flat field image after demosaic operation (zoomed 300%)

The green channel odd-even mismatch distribution (Gb Gain)
Each point represents one region (32x32 pixels)

The green channel odd-even mismatch distribution (Gr Gain)
Each point represents one region (32x32 pixels)

20

With applyed adaptive bayer filter to handle the green channel odd-even mismatch with moderate smoothing applied. (zoomed 300%)

The green channel Mismatch (Gr/Gb) of Indoor image.
Each point represents one region (32x32 pixels)

**The green channel Mismatch (Gr/Gb) of Outdoor image.
Each point represents one region (32x32 pixels)**

R1

| GREEN | BLUE | GREEN | BLUE | GREEN | BLUE | GREEN | BLUE |
|-------|------|-------|------|-------|------|-------|------|
| RED | GREEN | RED | GREEN | RED | GREEN | RED | GREEN |
| GREEN | BLUE | GREEN | BLUE | GREEN | BLUE | GREEN | BLUE |
| RED | GREEN | RED | GREEN | RED | GREEN | RED | GREEN |
| GREEN | BLUE | GREEN | BLUE | GREEN | BLUE | GREEN | BLUE |
| RED | GREEN | RED | GREEN | RED | GREEN | RED | GREEN |
| GREEN | BLUE | GREEN | BLUE | GREEN | BLUE | GREEN | BLUE |
| RED | GREEN | RED | GREEN | RED | GREEN | RED | GREEN |

Flat field image after region-by-region gain correction & demosaic.
Region size= 32x32. Zoomed 300%.

Flat field image without adaptive
channel balancing
(300% zoom and with demosaic)

Flat field image with adaptive
channel balancing
(300% zoom and with demosaic)

Resolution chart image (center circles) without adaptive channel balancing
(300% zoom and with demosaic)

Resolution chart image (center circles) with adaptive channel balancing
(300% zoom and with demosaic)

Resolution chart image (vertical lines) without adaptive channel balancing
(300% zoom and with demosaic)

Resolution chart image (vertical lines) with adaptive channel balancing
(300% zoom and with demosaic)

Resolution chart image (horizontal lines) without adaptive channel balancing
(300% zoom and with demosaic)

Resolution chart image (horizontal lines) with adaptive channel balancing
(300% zoom and with demosaic)

MacBeth chart image without adaptive channel balancing
(300% zoom and with demosaic)

MacBeth chart image with adaptive channel balancing
(300% zoom and with demosaic)

MacBeth chart image without adaptive channel balancing
(with demosaic)

MacBeth chart image with adaptive channel balancing
(with demosaic)

METHOD AND APPARATUS FOR ADAPTIVE AND SELF-CALIBRATED SENSOR GREEN CHANNEL GAIN BALANCING

CROSS-REFERENCE TO RELATED APPLICATIONS

This application claims the benefit of earlier filed provisional patent application Ser. No. 60/760,769, filed on Jan. 19, 2006 and provisional patent application Ser. No. 60/759,842, filed Jan. 18, 2006 both of which are incorporated herein by reference as if set forth in full below.

BACKGROUND OF THE INVENTION

I. Field of the Invention

The present invention relates generally to image correction methods and, more specifically, to a process for adaptively removing green channel odd-even mismatch.

II. Background

As the sensor pixel count increases, the area of each pixel photodiode shrinks. The signal readout circuit has to take care of reading and transferring the weaker signal levels. For sensors with a RGB bayer pattern, the Green channel on the odd and even rows normally are read out via a different circuit. More specifically, the metal wire layout of the photo diode, electronic leakage, light incident angle and the signal output circuit, causes the green channel of a bayer pattern sensor to exhibit an unbalanced response. This imbalance contains both global and local variation. Although the circuit layout is identical, the imperfect manufacturing process can cause the read-out and amplifier circuit to be mismatched. Also, the non-uniformity of the color filter array and lens coating and mounting, etc., can also cause the green channel to exhibit odd-even mismatch. Therefore, the overall green channel odd-even mismatch is location dependent and non-uniform. The green channel odd-even mismatch makes the image processing task difficult because the green channel odd-even mismatch translates into cross hatched patterns of artifact as shown in FIG. 1.

In FIG. 1, a flat field image 10 was created with demosaic operation. This flat field image is supposed to be flat because the lens was covered with a diffusion lens. There should not be any texture on the image after it is processed. However, as is seen in FIG. 1, cross hatched patterns are prevalent across the entire image 10. Further investigation reveals that this artifact is caused by the green channel odd-even mismatch.

The demosaic algorithm normally depends greatly on the green channel signal to determine the edge because 50% of the bayer pixels are green. An exemplary bayer pixel arrangement is shown in FIG. 10B. However, if there is a green channel odd-even mismatch, such mismatch is treated as an edge and the demosaic module tries to preserve such edge in either vertical or horizontal directions. The end result is the cross hatched patterns shown in FIG. 1 after demosaic processing. This artifact is most obvious when the image is zoomed in around 300%.

One failed solution proposed a global green channel gain balance. If the channel read-out and amplifier circuit were the only factors for green odd-even mismatch, then applying a global green channel gain balance may solve the problem. However, for a Sony™ 3 MP sensor, the use of a global green channel gain balance did not work. Further analysis reveals that the odd-even mismatch is not uniform across the entire image.

Dividing the 3 MP sensor image into regions with 32×32 pixels per region, the flat field image is performed with a region-based channel balance calibration. The required Gr gain and Gb gain to balance the green channel is shown in the FIGS. 2A and 2B. As can be easily seen from FIGS. 2A and 2B, the green channel balance is very non-uniform across the entire image. As a result, applying global green channel gains can not solve the problem or eliminate the cross hatched pattern of artifact shown in FIG. 1.

Another possible solution employs an adaptive bayer filter. The adaptive bayer filter can be applied only on green pixels to smooth out the odd-even mismatch. The issue is, for the Sony sensor under study, some regions show a green channel odd-even mismatch of 13%. If such a large mismatch is intended to be smoothed out, the true edges in the images may suffer too. As a result, the images will be blurred.

Furthermore, the computation cost of the adaptive bayer filter is relatively high in terms of software/firmware. The computations would also add a considerable amount of delay time to the snap shot image processing. FIG. 3 illustrates the resultant image 20 after applying an adaptive bayer filter to the flat field image of FIG. 1. The resultant image 20 has gone through the entire processing pipeline. A moderate amount of smoothing is applied in the adaptive bayer filter. While, in the resultant image 20 some cross hatched pattern artifact is smoothed out, some still remains.

If a much larger amount of smoothing is applied in the adaptive bayer filter, the cross hatched patterns can be completely removed but at the cost of blurred texture in the images.

If a straightforward smoothing is performed on the raw images on the bayer domain, the edges and textures will suffer. If each pair of green pixels (Gr and Gb) is forced to be equal, the high frequency edges suffer.

SUMMARY OF THE INVENTION

It is an object of the present invention to provide a method for adaptive green channel odd-even mismatch removal to effectuate the disappearance of artifacts created by such mismatch.

It is also an object of the present invention to provide an adaptive green channel odd-even mismatch removal module to effectuate the disappearance of artifacts created by such mismatch.

It is also an object of the present invention to provide program instructions executable by a processor to adaptively remove green channel odd-even mismatch to effectuate the disappearance of artifacts created by such mismatch.

It is a further object of the present invention to provide for adaptive green channel odd-even mismatch removal that is easily implemented in a manner that minimizes computation complexity and does not reduce image processing speed.

It is a further object of the present invention to provide for adaptive green channel odd-even mismatch removal in a manner that adaptively calibrates to correct the odd-even mismatch region-by-region to compensate for image content variances as well as indoor and outdoor image variances.

It is a further object of the present invention to provide for adaptive green channel odd-even mismatch removal in a manner that adaptively compensates for spatial variant green channel odd-even mismatch.

It is a further object of the present invention to provide for adaptive green channel odd-even mismatch removal in a manner which uses an adaptive approach to solve the green channel odd-even mismatch with great preservation of the edges including high frequency edges and edges in either the vertical direction or horizontal direction.

In view of the above objects, the objects of the present invention are carried out by a method for adaptive green channel odd-even mismatch removal comprising the steps of: dividing a raw image from a sensor into a plurality of regions; and, for each region, adaptively removing green channel odd-even mismatch in the raw image to effectuate the disappearance of artifact in a demosaic processed image.

The objects of the present invention are carried out by a method which adaptively removes the green channel odd-even mismatch by calibrating region-by-region of the raw image a green (GR) channel gain for red rows and a green (GB) channel gain for blue rows. After the calibrating step, then applying, region-by-region, the GR channel gain to green pixels in the red rows and the GB channel gain to the green pixels in the blue rows calibrated for each respective region to remove the green channel odd-even mismatch.

The objects of the present invention are carried out by a method to adaptively remove the green channel odd-even mismatch by, for each region in the raw image, by generating a weighted center green pixel value based on a first weighting factor for a center green pixel; summing weighted green pixel values based on a second weighting factor for surrounding green pixels in a first tier layer with respect to the center green pixel of the region to form a first tier layer sum; summing weighted green pixel values based on a third weighting factor for surrounding green pixels in a second tier layer with respect to the center green pixel of the region to form a second tier layer sum; summing the weighted center green pixel value, the first tier layer sum and the second layer sum to form a weighted green pixel sum total. After the weighted green pixel sum total is created, the weighted green pixel sum total is normalized. The normalized weighted green pixel sum total replaces the center green pixel value of the region to remove the green channel odd-even mismatch.

The objects of the present invention are carried out by a method which removes the green channel odd-even mismatch from a raw bayer image.

The objects of the present invention are carried out by a method which removes the green channel odd-even mismatch before demosaic processing by removing edge pixels region-by-region of an image when calibrating the gains.

The objects of the present invention are carried out by a method for adaptive green channel odd-even mismatch removal that when calibrating, filters out bad pixels and edge pixels in each region to form a set of valid pixel pairs.

The objects of the present invention are carried out by a method for adaptive green channel odd-even mismatch removal that when calibrating, counts a number of the valid pixel pairs in the region, computes an average number of the valid green pixels for the red rows, and computes an average number of the valid green pixels for the blue rows.

The objects of the present invention are carried out by a method for adaptive green channel odd-even mismatch removal that when calibrating, filters the GR channel gain and the GB channel gain with a GR channel gain and a GB channel gain of a previous image to reduce noise variance. The applied GR channel gain and the applied GB channel gain are the filtered GR channel gain and the filtered GB channel gain, respectively.

The objects of the present invention are carried out by a method for adaptive green channel odd-even mismatch removal that includes multiplying the green pixels in red rows in each region with the GR channel gain; and multiplying the green pixels in blue rows with the GB channel gain to correct the odd-even mismatch and effectuate the disappearance of the artifact after demosaic processing.

The objects of the present invention are carried out by program code executed by a processing device comprising instructions operable upon execution to calibrate region-by-region in an image a GR channel gain and a GB channel gain. The instruction are also operable to apply, region-by-region, the GR channel gain and the GB channel gain calibrated for each respective region to adaptively remove green channel odd-even mismatch from the image.

The objects of the present invention are carried out by an adaptive green channel odd-even mismatch removal module comprising: means for calibrating region-by-region in an image a GR channel gain and a GB channel gain. The module also includes means for applying, region-by-region, the GR channel gain to green pixels in the red rows and the GB channel gain to the green pixels in the blue rows calibrated for each respective region for removing the green channel odd-even mismatch.

The objects of the present invention are carried out by an adaptive green channel odd-even mismatch removal module the comprises a means for generating a weighted center green pixel value based on a first weighting factor for a center green pixel. The module further comprises a means for summing weighted green pixel values based on a second weighting factor for surrounding green pixels in a first tier layer with respect to the center green pixel of the region to form a first tier layer sum, and a means for summing weighted green pixel values based on a third weighting factor for surrounding green pixels in a second tier layer with respect to the center green pixel of the region to form a second tier layer sum. The module also includes a means for summing the weighted center green pixel value, the first tier layer sum and the second layer sum to form a weighted green pixel sum total, a means for normalizing the weighted green pixel sum total, and a means for replacing a pixel value of the center green pixel with the normalized weighted green pixel sum total to remove the green channel odd-even mismatch.

The objects of the present invention are carried out by program code executed by a processing device comprising instructions operable upon execution to generate a weighted center green pixel value based on a first weighting factor for a center green pixel. The program code is further operable to sum weighted green pixel values based on a second weighting factor for surrounding green pixels in a first tier layer with respect to the center green pixel of the region to form a first tier layer sum, and sum weighted green pixel values based on a third weighting factor for surrounding green pixels in a second tier layer with respect to the center green pixel of the region to form a second tier layer sum. The program code is further operable to sum the weighted center green pixel value, the first tier layer sum and the second layer sum to form a weighted green pixel sum total, normalize the weighted green pixel sum total, and replace a pixel value of the center green pixel with the normalized weighted green pixel sum total to remove the green channel odd-even mismatch.

BRIEF DESCRIPTION OF THE DRAWINGS

The foregoing summary, as well as the following detailed description of preferred embodiments of the invention, will be better understood when read in conjunction with the accompanying drawings. For the purpose of illustrating the invention, there is shown in the drawings embodiments which are presently preferred. It should be understood, however, that the invention is not limited to the precise arrangement shown. In the drawings:

FIG. 10B illustrates the cross hatched region of FIG. 10A divided into 8×8 pixels;

DETAILED DESCRIPTION OF THE PREFERRED EMBODIMENTS

Figure 1:
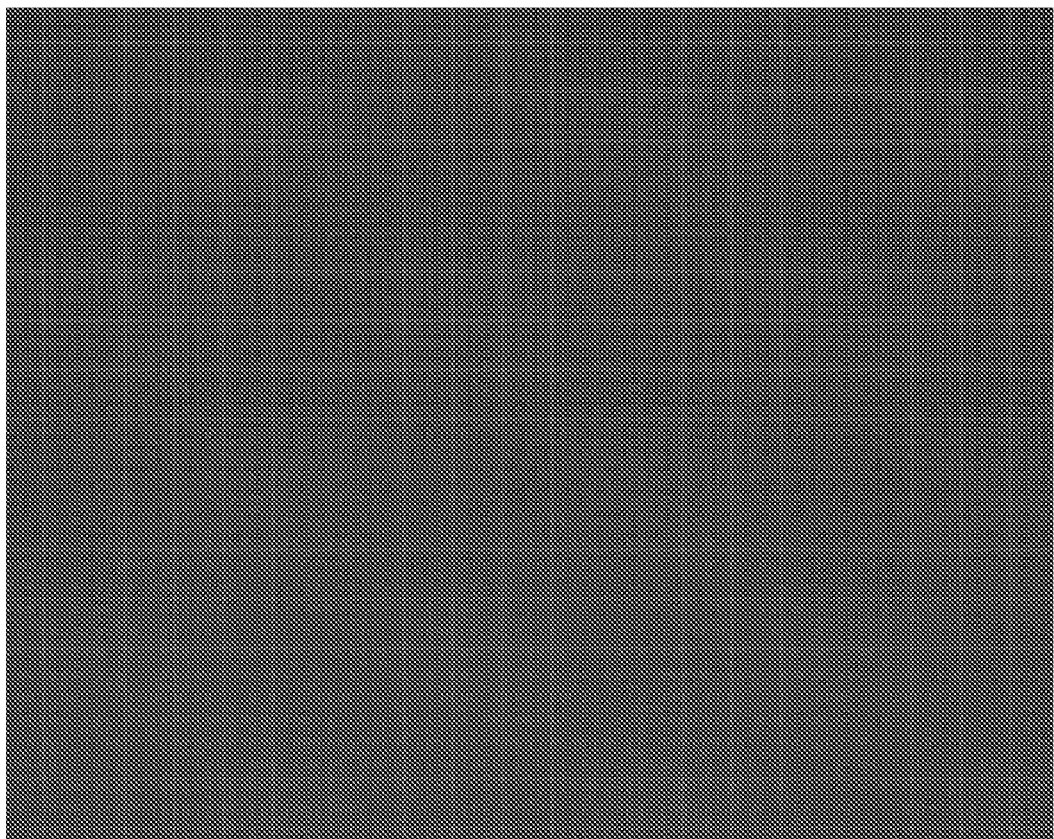
FIG. 1 illustrates a flat field image after demosaic operation (zoomed 300%)

While this invention is susceptible of embodiments in many different forms, this specification and the accompanying drawings disclose only some forms as examples of the use of the invention. The invention is not intended to be limited to the embodiments so described, and the scope of the invention will be pointed out in the appended claims.

The preferred embodiments of the green channel odd-even mismatch removal methods according to the present invention are described below with a specific application to a snap shot image. However, it will be appreciated by those of ordinary skill in the art that the present invention is also well adapted for other types of images requiring green channel correction. Referring now to the drawings in detail, wherein like numerals are used to indicate like elements throughout, there is shown in FIGS. 6A-6B and 7, a self-calibration process and correction process, generally designated at 100 and 120, according to the present invention.

However, to permit understanding of the invention, the odd-even mismatch refers to the green pixels on red rows with red and green pixels and to the green pixels on blue rows with blue and green pixels that are mismatched. Due to the multiple reasons mentioned previously, the green pixel response is different even though the scene is a smooth flat field image. The mismatch is normally characterized as the ratio of Gr/Gb. Where Gr means the green pixels on the red rows and Gb means the green pixels on the blue rows. Ideally, this ratio should be 1.0.

Figure 2A:
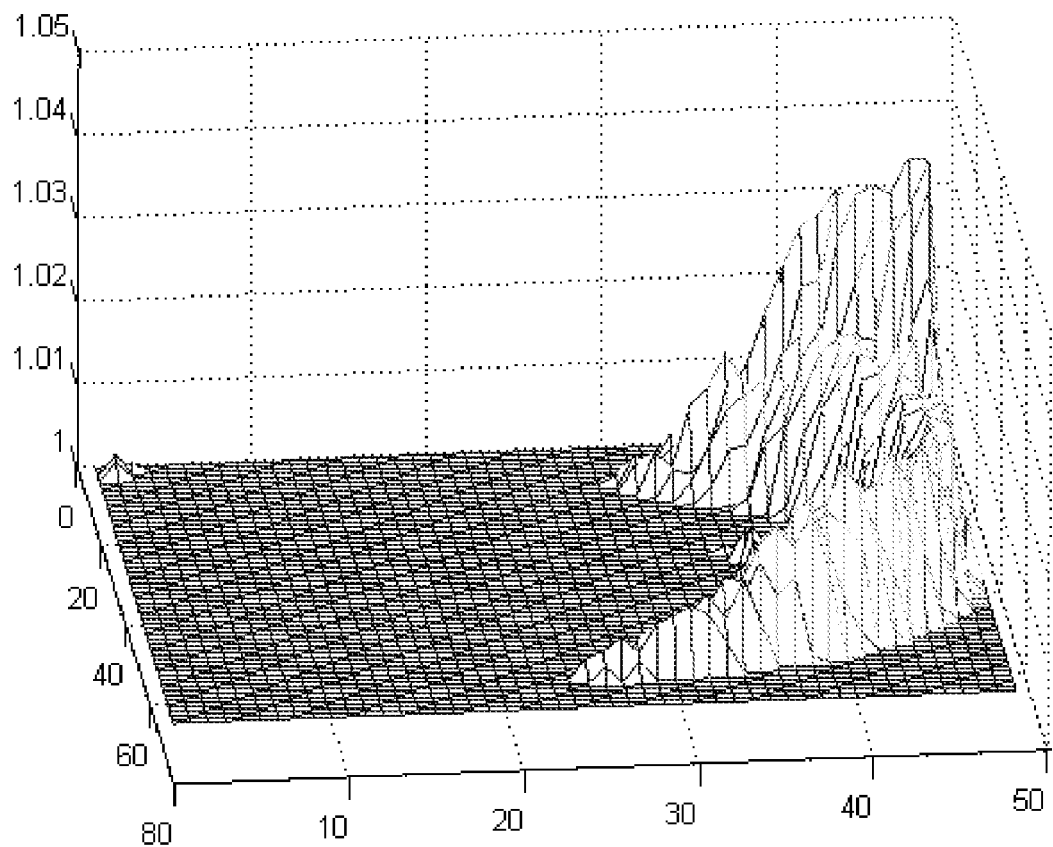
FIG. 2A illustrates a plot of a Gb gain distribution for a green channel odd-even mismatch distribution where each point represents one region (32×32 pixels)
Figure 2B:
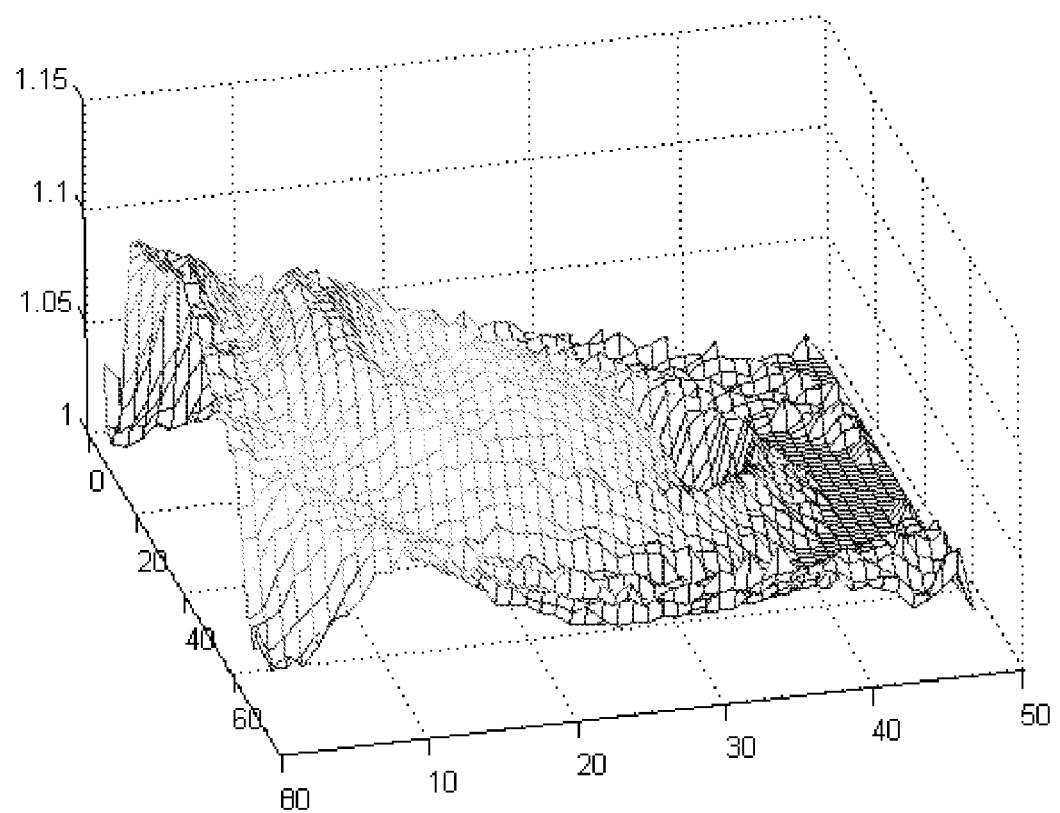
FIG. 2B illustrates a plot of a Gr gain distribution for the green channel odd-even mismatch distribution where each point represents one region (32×32) pixels.
Figure 3:
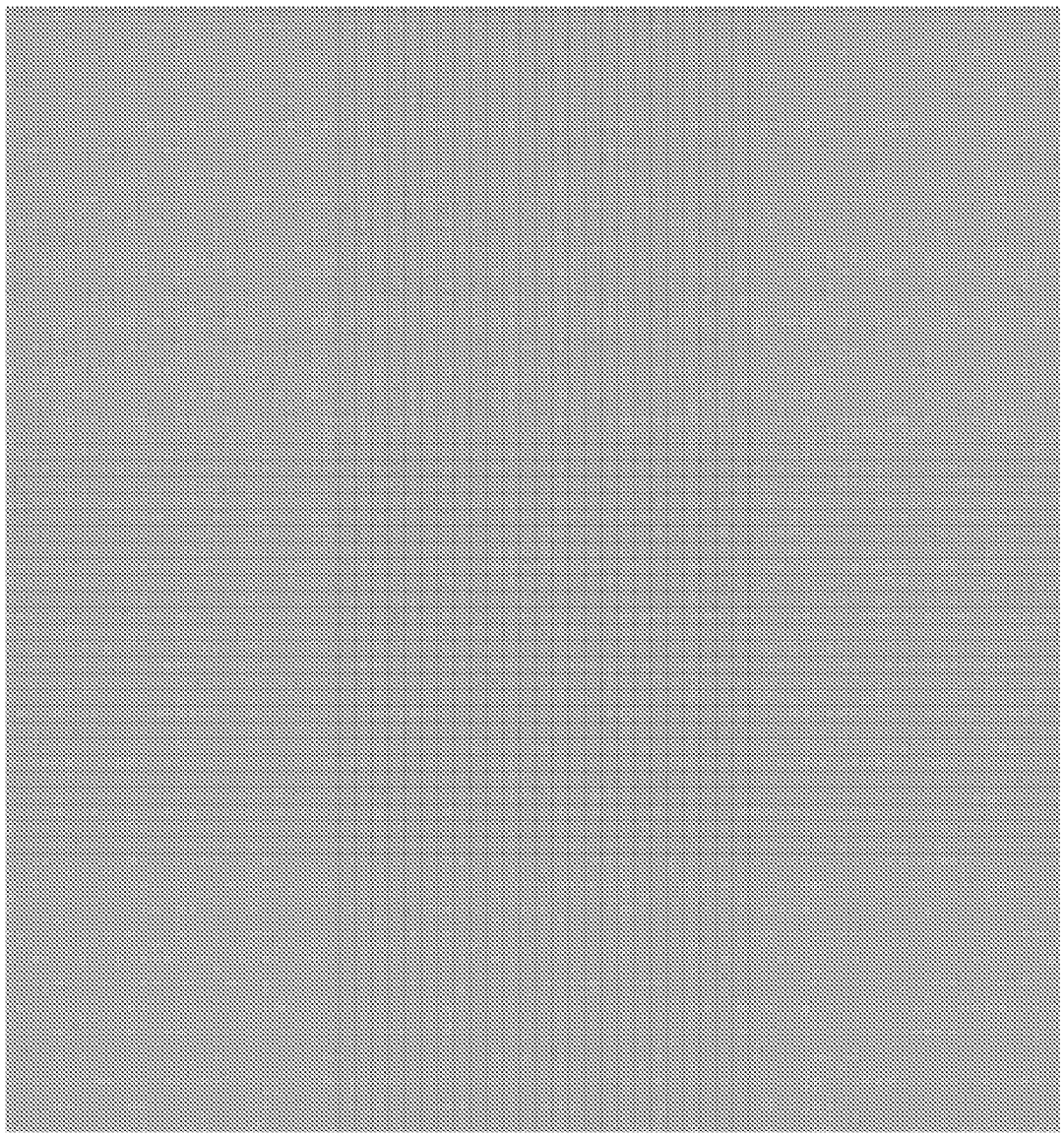
FIG. 3 illustrates a modified flat field image after applying an adaptive bayer filter to handle the green channel odd-even mismatch with moderate smoothing (zoomed 300%)
Figure 4:
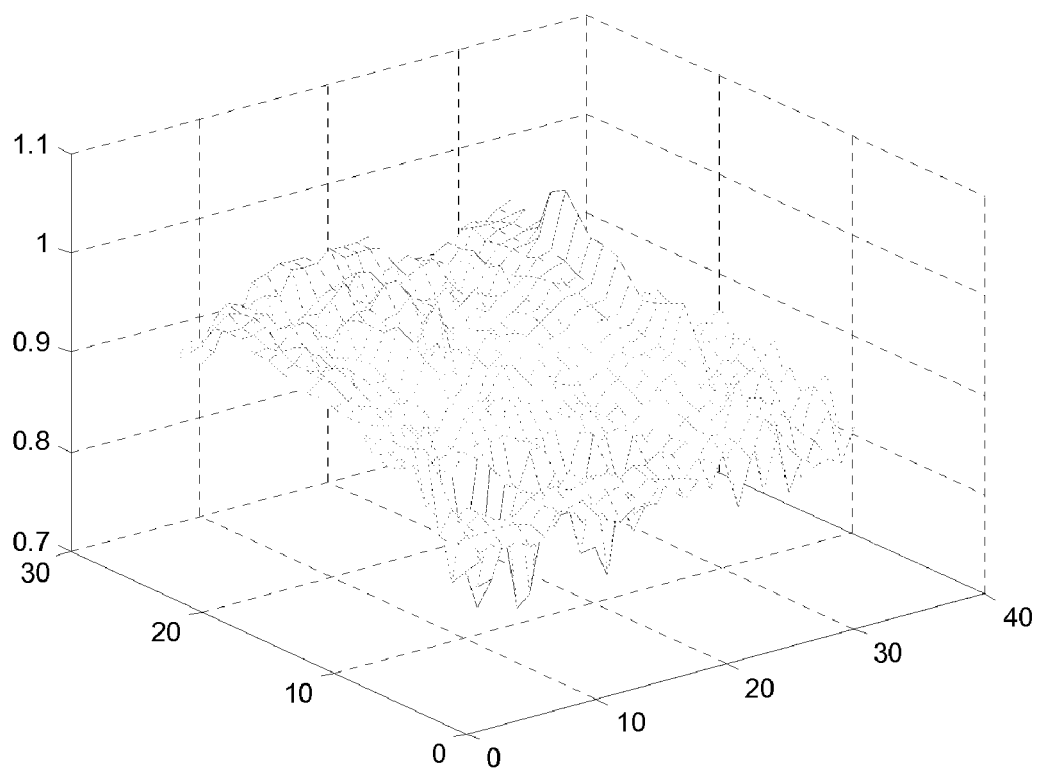
FIG. 4 illustrates a plot of a green channel mismatch (Gr/Gb) of an indoor image where each point represents one region (32×32 pixels)
Figure 5:
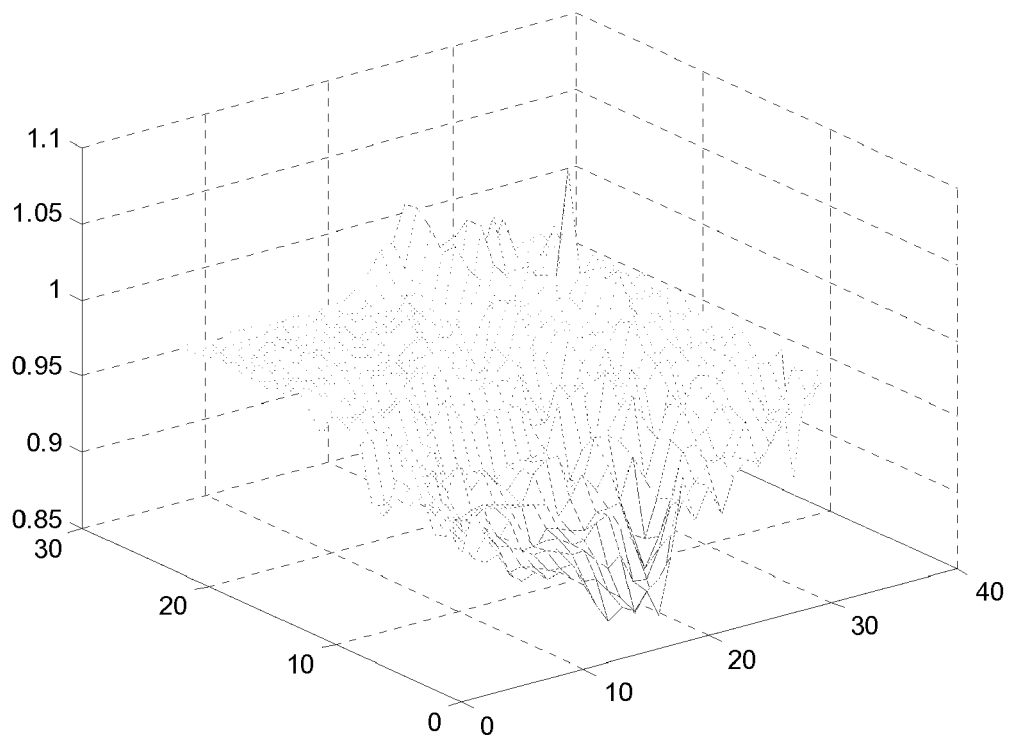
FIG. 5 illustrates a plot of the green channel mismatch (Gr/Gb) of an outdoor image where each point represents one region (32×32 pixels)

As shown in FIGS. 2A and 2B, the green channel odd-even mismatch is very non-uniform across the entire image. The mismatch pattern can not be modeled in a simple way. It is clear that the green channel mismatch varies from sensor to sensor. Moreover, different modules of the same sensor model can deviate. By comparing a green channel mismatch of an indoor image in FIG. 4 with a green channel mismatch of an outdoor image in FIG. 5 captured by the same sensor, it can be readily seen that the green channel mismatch depends on the image contents as well.

Figure 6A:
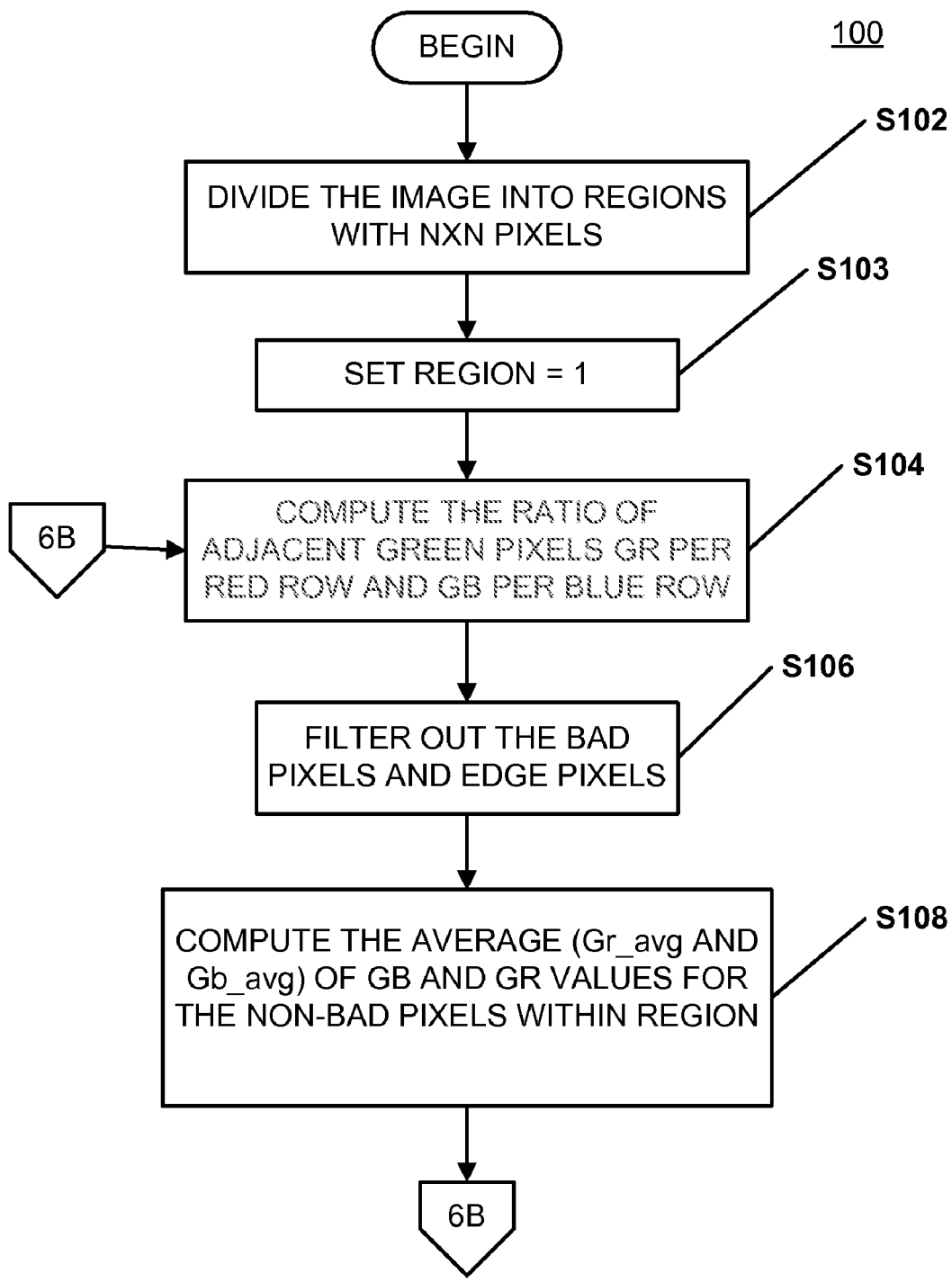
FIGS. 6A-6B illustrate flowcharts for the adaptive region-by-region green channel gain self-calibration process of the green channel odd-even mismatch removal method.
Figure 6B:
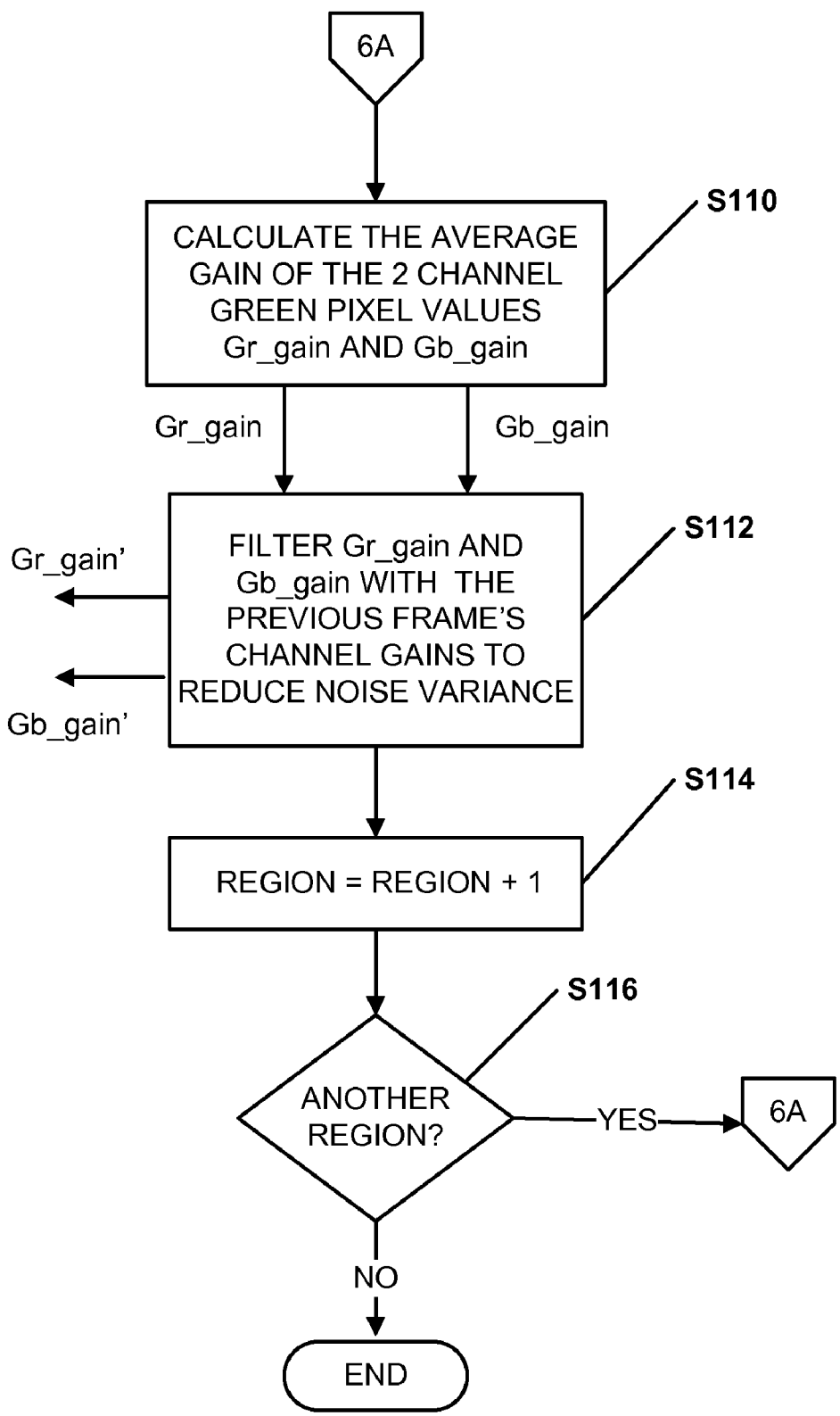
Figure 7:
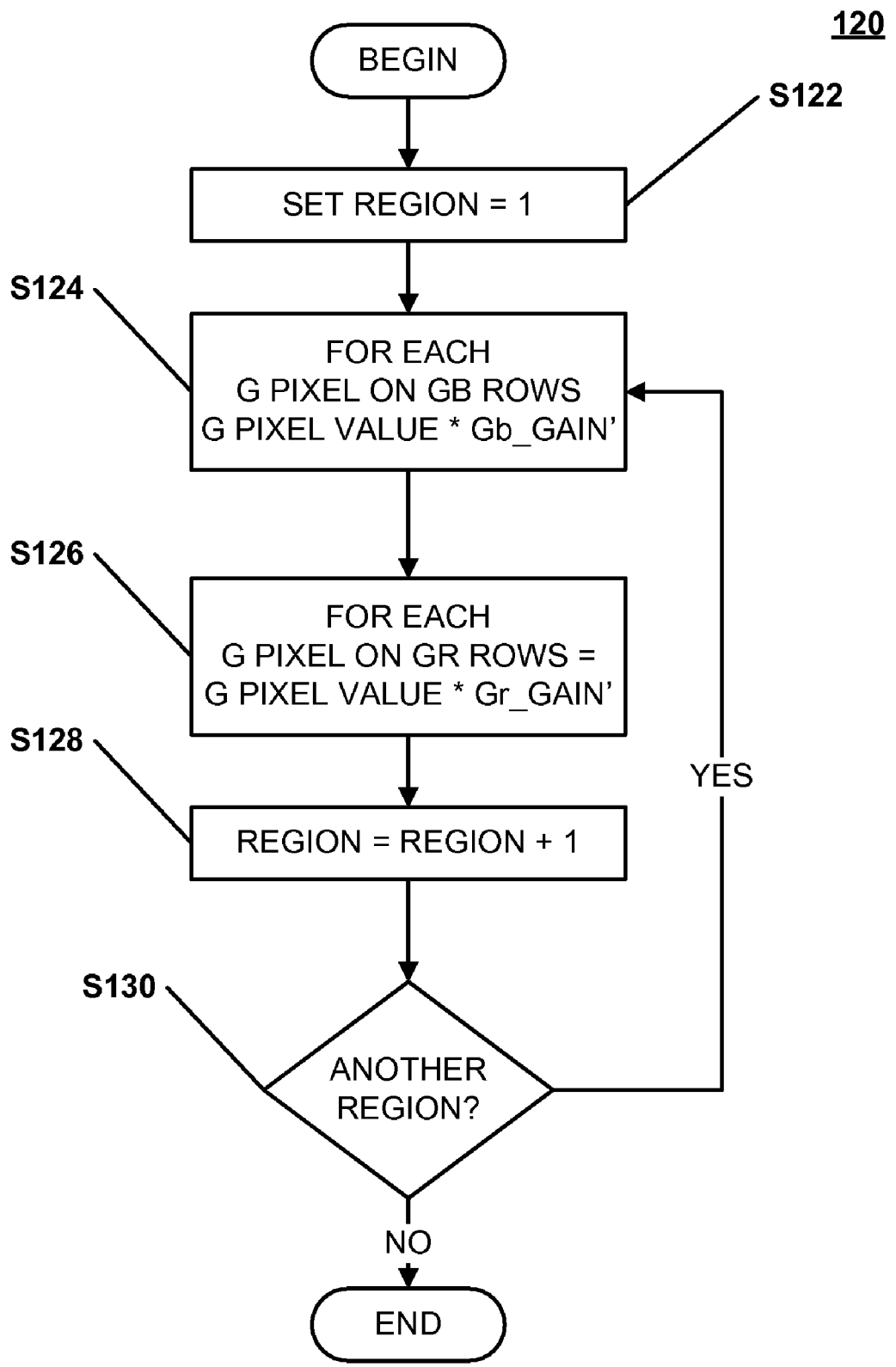
FIG. 7 illustrates a flowchart for the correction process of the green channel odd-even mismatch removal method.

In the first exemplary embodiment, the green channel odd-even mismatch removal method includes an adaptive region-by-region green channel gain self-calibration process 100 described in relation to FIGS. 6A-6B and a correction process 120 described in relation to FIG. 7. In general, the green channel odd-even mismatch removal method compensates for the green channel mismatch with an adaptive region-by-region green channel gain self-calibration process 100, and then applying the green channel gains region-by-region to every final snap shot image output from the sensor module 210 (FIG. 11) of the snap shot imaging device 200 in the correction process 120.

Figure 8:
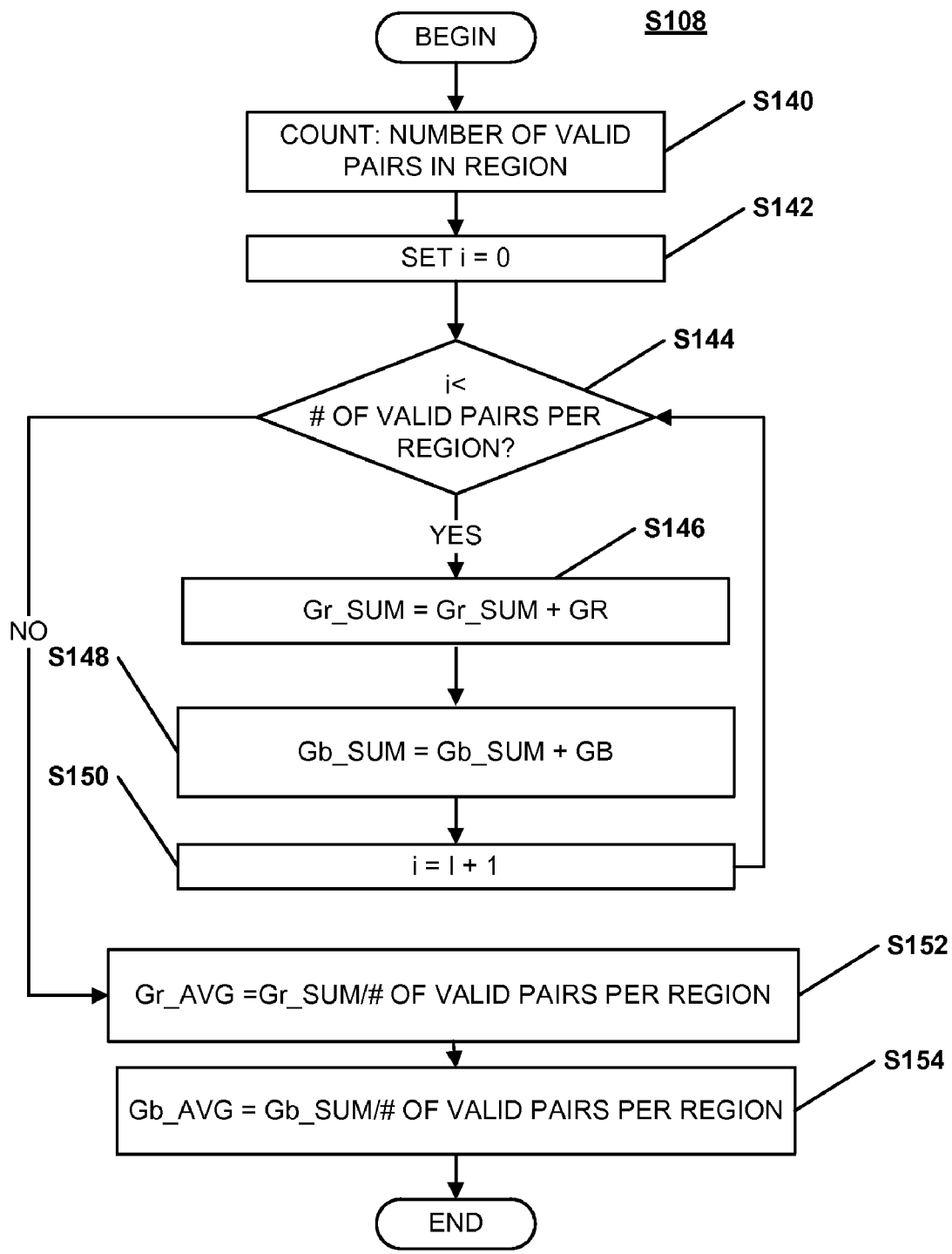
FIG. 8 illustrates a flowchart to calculate the average GB and GR values for the valid pixel pairs.
Figure 9:
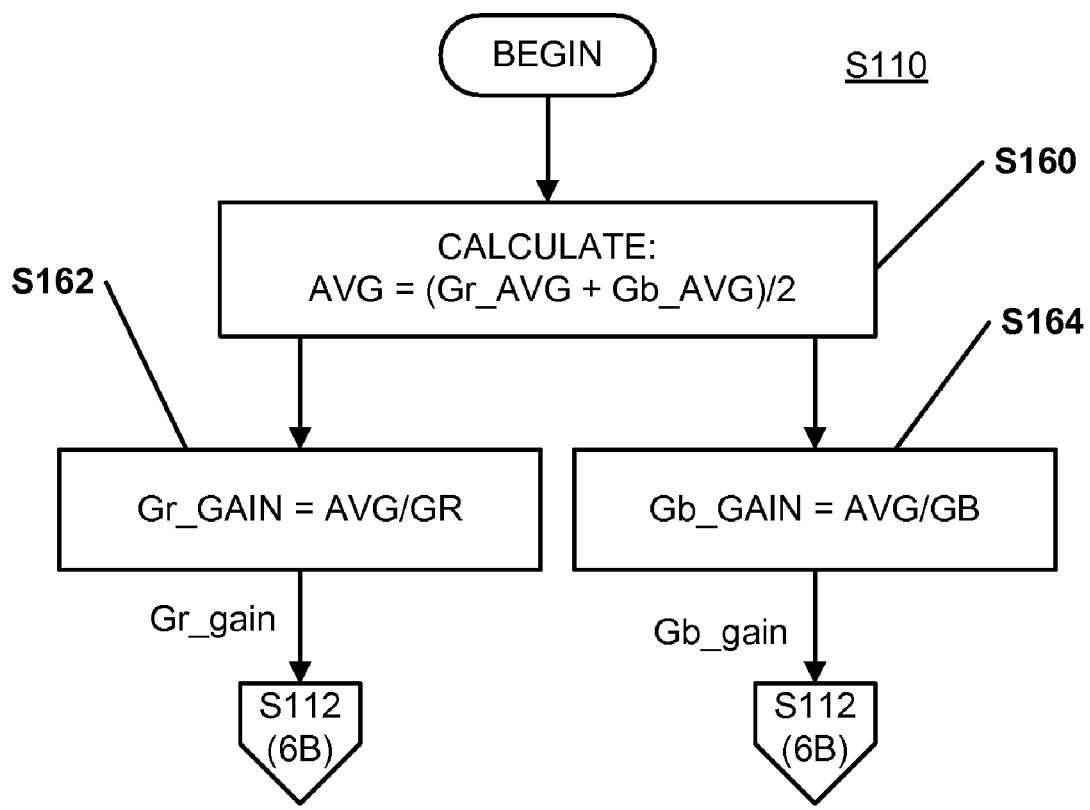
FIG. 9 illustrates a flowchart to calculate the average gain for each GB, GR pair.
Figure 10A:
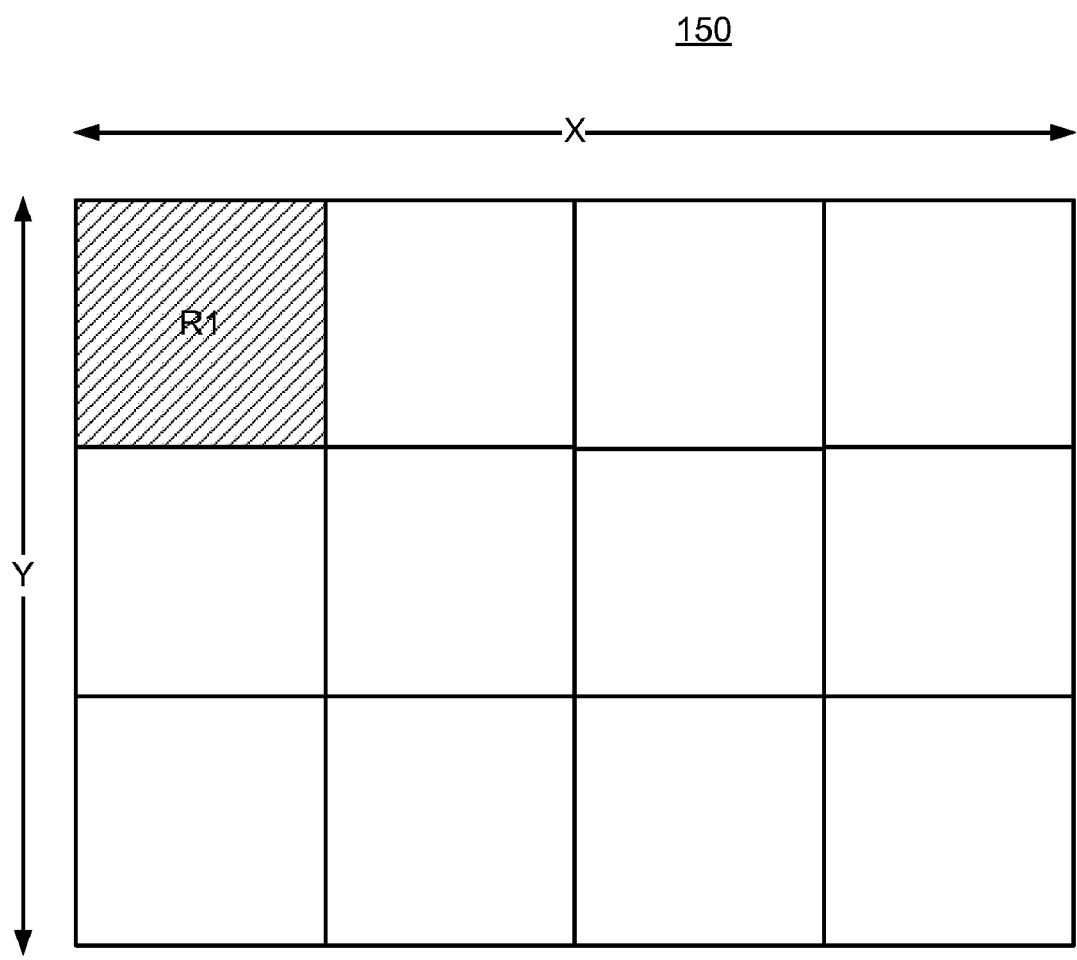
FIG. 10A illustrates a divided raw bayer image with 4×3 regions with one region cross hatched.

Referring now to FIGS. 6A-6B, 8, 9 and 10A-10B, the adaptive region-by-region green channel gain self-calibration process 100, begins with step S102 wherein an entire image 150 output from the sensor module 210 (FIG. 11), such as a raw image, is divided into X by Y regions (FIG. 10A) with M×M pixels (FIG. 10B) where M is a multiple of 2. In the exemplary embodiment, the image 150 is divided into 4×3 (X=4, Y=3) regions where each region is divided into 8×8 pixels. For this example, there are 12 regions in the image 150. The hatched region labeled R1 is divided into M×M pixels as shown in FIG. 10B. The image 150 is a raw bayer image and has not been subjected to demosaic processing 230. Thus, FIG. 10B illustrates a raw bayer representation of the region R1.

For illustrative purposes only, the first row in FIG. 10B is a blue row with alternating green and blue pixels. The green pixels in the blue row are denoted as GB. The second row immediately following the first row is a red row having alternating green and red pixels. The green pixels on the red row are denoted as GR. In the exemplary embodiment, the first column in FIG. 10B includes alternating green and red pixels.

Returning again to the flowchart of FIG. 6A, step S102 follows step S103 where the region is set to 1. Step S103 is followed by step S104 where for each region, the ratio of adjacent green pixels GR and GB on red rows and blue rows is computed. In the exemplary embodiment, two GB, GR pixel pairs of every region is selected. Step S104 is followed by step S106 where the bad pixels and edge pixels are filtered out.

Bad pixels can be detected based on neighboring pixels of the same color. For example, if the comparison of the current pixel and a neighboring pixel of the same color exceeds some threshold, then the current pixel may be determined to be bad. On the other hand, edge pixel detection may employ a window of A×A size and 2-D convolution. The output of the 2-D convolution is compared with a threshold. If the output is greater than the threshold, the output is an edge. Otherwise, the output is not an edge. There are numerous bad pixel detection and edge pixel detection algorithms. Hence, the above description of bad pixel detection and edge pixel detection are for illustrative purposes only.

Step S106 is followed by step S108 where the average of GB and GR pixel values, denoted as Gr_avg and Gb_avg, for the non-bad pixels within the region are computed. Step S108 is followed by step S10 in FIG. 6B. The Gr_avg and Gb_avg are calculated below based on equations Eq. (1) and Eq. (2), respectively, set forth below.

Referring now to FIG. 8, the process for calculating the Gr_avg and Gb_avg pixel values is described. Also an exemplary code for calculating Gr_avg and Gb_avg is provided in the Appendix following this section. The process of step S108 begins with step S140 where the number of valid pixel pairs (#VP) in the region under consideration is counted or determined. The valid pairs are non-bad pixel pairs remaining after the filtering step S106. Step S140 is followed by step S142 where i is set to 0. Step S142 is followed by step S144, a determination step, which determines whether i is less than the number of valid pairs (#VP) of the region. If the determination is "YES", a sum, denoted as Gr_sum, is calculated for the GR pixel values for the non-bad green pixels GR in the red rows at step S146. Step S146 is followed by step S148 where a sum, denoted as Gb_sum is calculated for the GB pixel values for the non-bad green pixels GB in blue rows. Step S148 is followed by step S150 where i is incremented by 1.

Step S150 returns to step S144. Steps S144, S146, 148 and 150 are a loop and are repeated until i is less than the number of valid pairs. Thus, at step S146, the sum is incremented by the green pixel value for each corresponding non-bad GR pixel in the region. At step S148 the sum is incremented by the green pixel value for each corresponding non-bad GB pixel.

Once all of the non-bad GR and GB pixels are separately summed, Step S144 is followed by step S152 where Gr_avg (the average pixel value for non-bad green pixels in red rows of a region) is calculated based on equation Eq. (1) defined as:

$$Gr\_avg = Gr\_sum / \text{Number of Valid Pairs per Region}. \quad \text{Eq. (1)}$$

Step S152 is followed by step S154 where the Gb_avg (the average pixel value for non-bad green pixels in blue rows of a region) is calculated based on equation Eq. (2) defined as:

$$Gb\_avg = Gb\_sum / \text{Number of Valid Pairs per Region}. \quad \text{Eq. (2)}$$

Referring now to FIG. 6B and FIG. 9, at step S110 the average gain of the 2 channel green pixel values Gr_gain and Gb_gain is calculated. This means the weaker green channel is applied a digital gain >1 while the stronger green channel is applied a digital gain <1.0. Note the goal of this process is to balance the green pixels from the 2 channels, not among different color channels, therefore applying a gain <1.0 will not cause color shift. Therefore, the channel gain of each (GB, GR) pair could be derived in the following equations Eq. (3) at step S160, Eq. (4) at step S162 and Eq. (5) at step S164 defined as:

$$avg = (Gr\_avg + Gb\_avg)/2; \quad \text{Eq. (3)}$$

$$Gr\_gain = avg/GR\_avg; \quad \text{Eq. (4)}$$

$$Gb\_gain = avg/GB\_avg; \quad \text{Eq. (5)}$$

where avg is the average value calculated from the average for the valid (non-bad) green pixels GR in the red rows calculated in equation Eq. (1) and the valid (non-bad) green pixels GR in the blue rows calculated in equation Eq. (2) for the non-bad or valid pixel pairs within the region.

Step S110 produces the channel gains of Gr_gain and Gb_gain which are passed to step S112. At step S112, the Gr_gain and Gb_gain of the current image 150 could be lowpass filtered with the previous image's channel gains (Gr_gain and Gb_gain) to reduce the noise variance. The filtered Gr_gain and Gb_gain of the current image is denoted as Gr_gain' and Gb_gain'.

The box representing step S112 has two outputs denoted as Gr_gain' and Gb_gain' which would be stored for use in calculations in the correction process. Step S112 is followed by step S114 where the region is incremented.

The process in FIGS. 6A-6B is repeated to calculate the Gr_gain and Gb_gain or if filtered Gr_gain' and Gb_gain' for each region. Accordingly, Step S114 is followed by a determination step S116 to determine if there are any more regions. If "YES," step S116 returns to step S104 of FIG. 6A to self-calibrate the next region. Otherwise, if there are no more regions, the self-calibration process 100 to calibrate the two channel gain ends.

Referring now to FIG. 7, the correction process 120 using the Gr_gain' and Gb_gain' for each region will now be described. The process 120 begins with step S122 where region is set to 1. Step S122 is followed by step S124 where the pixel value for each green pixel GB in blue rows is multiplied with Gb_gain'. Step S124 is followed by step S126 where the pixel value for each green pixel GR in red rows is multiplied with Gr_gain'. Step S126 is followed by step S128 where the region is incremented. Step S128 is followed by step S130 where a determination is made whether there are any more regions. If "NO," the process 120 ends. Otherwise, if "YES," step S130 returns to step S124 where the correction is applied to the next region.

Figure 12:
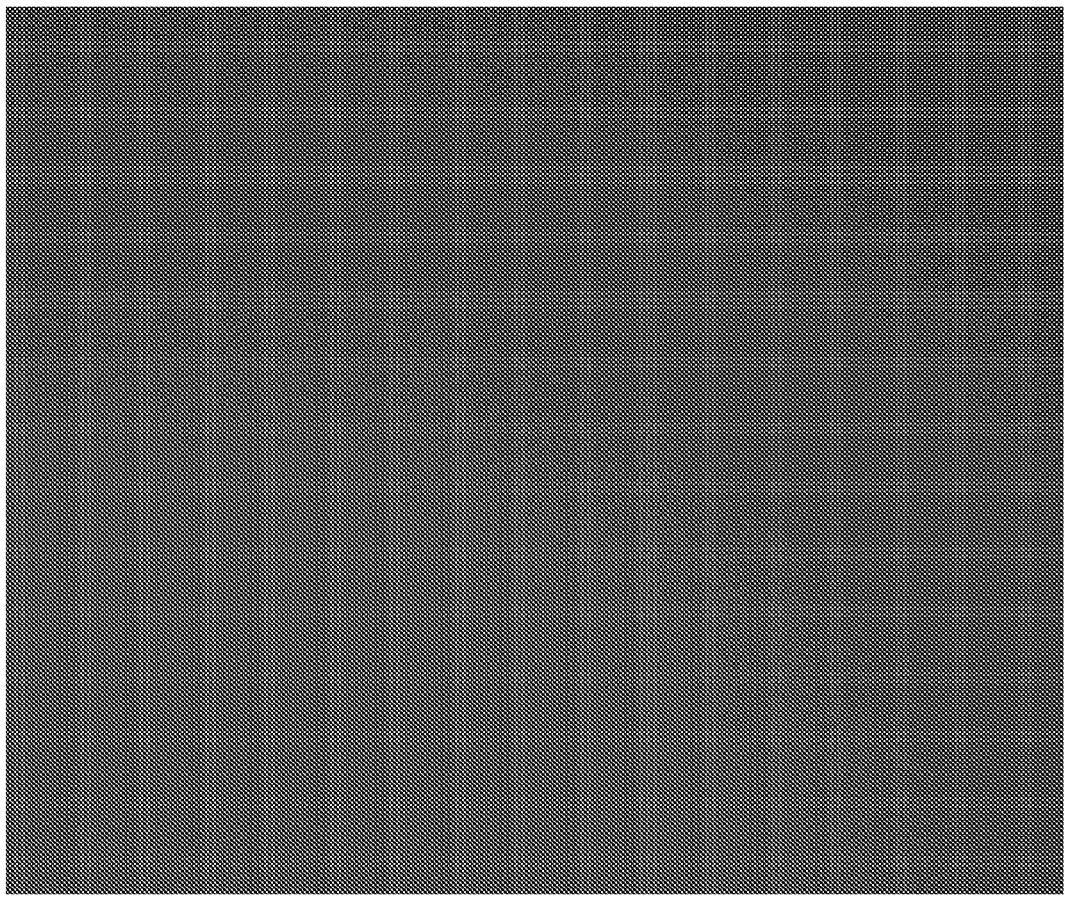
FIG. 12 illustrates a flat field image after region-by-region gain correction and demosaic where each region size is 32×32 (zoomed 300%)

With a region size of 32×32 pixels, the self-calibration and correction processes 100 and 120 were performed with a test image, and the demosaic output of the test image no longer shows any cross hatched patterns. Since the region size of 32×32 is small enough, therefore, the corrected image does not show any perceivable region boundary artifact. However, if the region size is too large, such as 256×256, the blockiness artifact may become perceivable. FIG. 12 shows the corrected image 10' after demosaic processing. Compared to FIG. 1, the image 10' in FIG. 12 is a great improvement.

Figure 11:
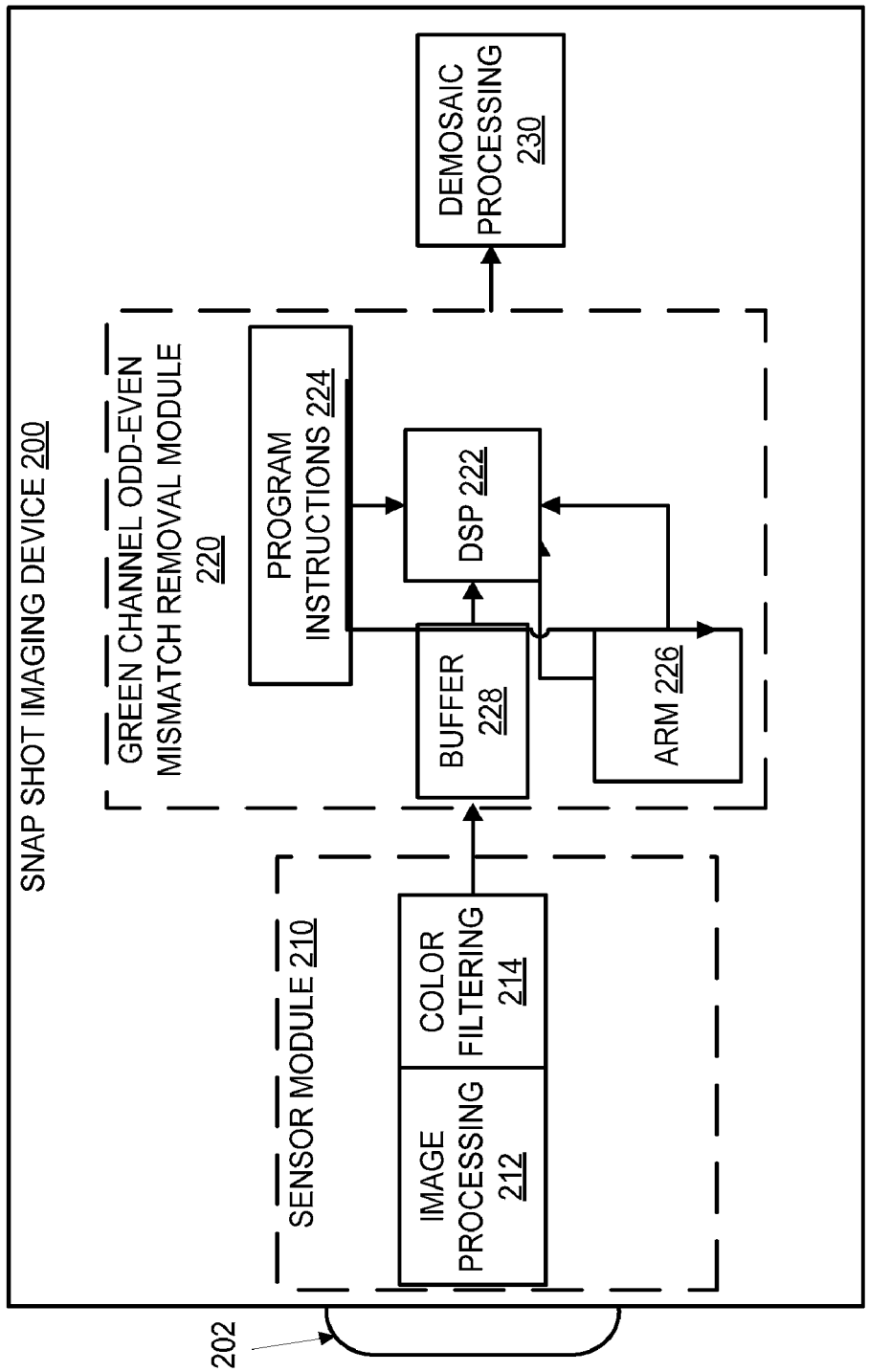
FIG. 11 illustrates a block diagram of a snap shot imaging device incorporating a green channel odd-even mismatch removal module.

Referring now to FIG. 11, the snap shot imaging device 200 includes a lens 202 and a sensor module 210 having an image processing unit 212 and a color filtering unit 214. The color filtering unit 214 is a bayer color filter array which produces a raw bayer image. This raw bayer image is corrected by the green channel odd-even mismatch removal module 220. The sensor values for all three primary colors red, green and blue at a single pixel location, are interpolated from adjacent pixels. This process of interpolation is carried out by the demosaic processing unit 230. There are a number of demosaicing methods such as pixel replication, bilinear interpolation and median interpolation. The output of the adaptive green channel odd-even mismatch removal module 220 provides a corrected raw bayer image to the demosaic processing unit 230.

The green channel odd-even mismatch removal method performed by the green channel odd-even mismatch removal module 220 can be implemented using firmware, software, and hardware. For a firmware implementation a digital signal process (DSP) 222 reads one region at a time, the ARM (Advanced RISC Machine) 226 supplies the Gr_gain' and Gb_gain' to the DSP 222. The DSP 222 performs the multiplication on the Green pixels. The processing is in place, i.e., the input and output pixels share the same buffer 228. In other words, the image pixels can be directly replaced with a new value without having to allocate another buffer for processing. The program instructions 224 when executed are operable to perform the adaptive region-by-region green channel gain self-calibration process 100 and the correction process 120.

While the DSP 222 and the ARM 226 are shown as part of the green channel odd-even mismatch removal module 220, the snap shot imaging device 200 may already include the DSP 222 and the ARM 226 to carry out the functions in the image processing unit 212, the color filtering unit 214 and the demosaic processing unit 230. Thus, the processing devices to execute the program instructions 224 may already be present.

On the other hand, for the software implementation the program instructions written in a programming language, such as without limitation, C code, runs on the ARM 226 to divide the raw image, such as a raw bayer image, into regions and performs multiplication on the green pixels using the Gr_gain' and Gb_gain' for that region. The ARM 226 is generally pre-existing and can be used to execute the program instructions 224. Thus, the ARM 226 performs both the self-calibration and correction processes 100 and 120. With the software implementation, the processing is also in place so that the image pixels can be directly replaced with a new value without having to allocate another buffer for processing.

For the hardware implementation, the self-calibration and correction processes 100 and 120 can be implemented in hardware as long as the size of the look-up table is not an issue.

The green channel odd-even mismatch creates a whole new problem for the video front end (VFE) processing of an image processor. Due to the nature of the non-uniform mismatch distribution, the global channel gain did not solve the problem. The region-by-region calibration and correction processes 100 and 120 provide an efficient and fast method to solve the problem related to the non-uniform mismatch distribution.

Figure 13A:
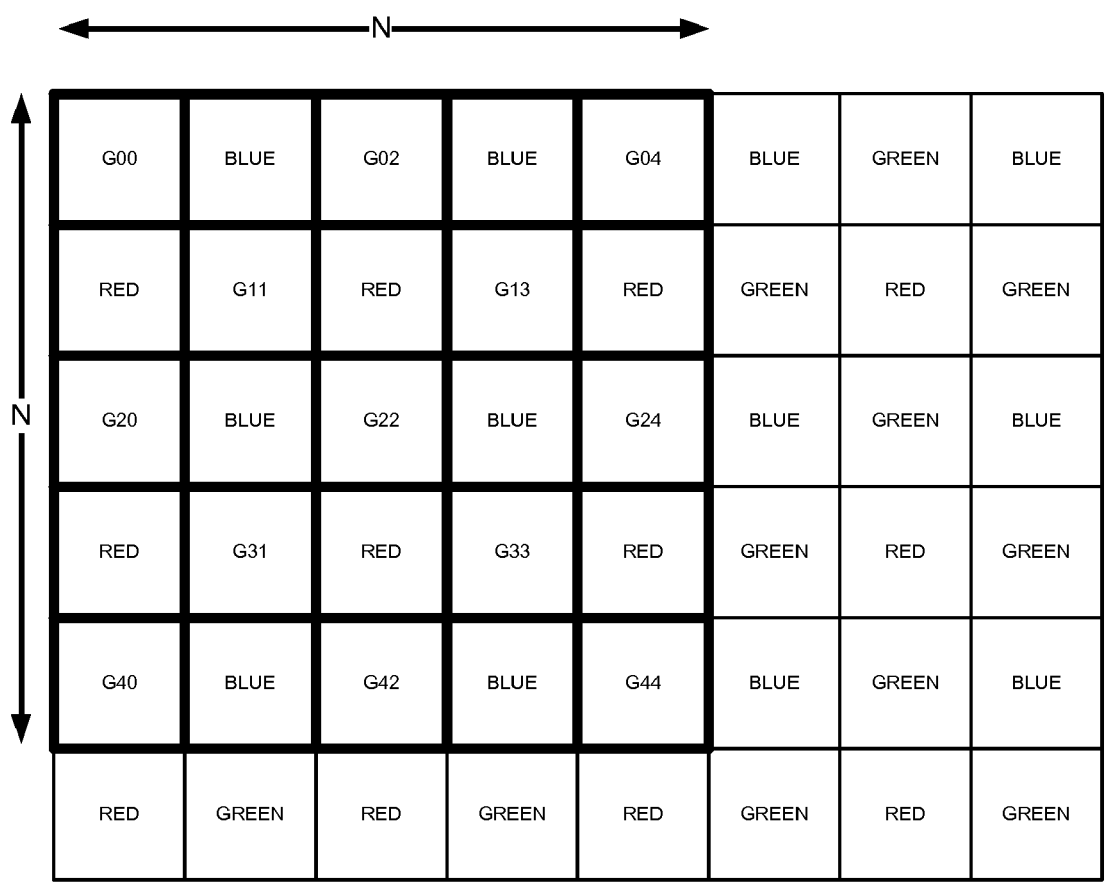
FIG. 13A illustrates a bayer pattern with Green pixel indexing.

FIG. 13A shows a typical RGB bayer pattern with green pixel indexing as will be described in more detail later. An alternative adaptive green channel odd-even mismatch removal method 300 for adaptively balancing the green channels to remove the odd-even mismatch is described in relation to the flowcharts of FIGS. 14A-14E and images of FIGS. 13A-13B. In this embodiment, the program instructions 224 (FIG. 11) would be modified to include instructions operable to perform the adaptive green channel odd-even mismatch removal method 300 described herein.

The adaptive green channel odd-even mismatch removal method 300 begins with step S302 where a raw image, such as a raw bayer image, as best seen in FIG. 13A, is obtained. FIG. 13A has green pixels indexed to permit understanding of the method 300. Step S302 is followed by step S304 where regions of N×N pixels are created from the image. In the exemplary embodiment, N is odd and is equal to 5. Step S304 is followed by step S306 where a center green pixel (CGP) is selected. In this embodiment, the CGP is denoted as G22 in FIG. 13A. Step S306 is followed by step S308 where a first weighting factor is assigned to the CGP G22. In the exemplary embodiment, the first weighting factor is 8. Step S308 is followed by step S310 where a second weighting factor is assigned for all green pixels in the region N×N at a distance of 1 pixel from CGP. In the exemplary embodiment, there are four (4) nearby green pixels that are in the opposite green channel and the distance to the CGP is 1. These nearby pixels with a distance of 1 pixel will hereby be referred to as "GP1" and together define a first tier layer. The GP1s of the first tier layer include the green pixels indexed as G11, G13, G31 and G33. In the exemplary embodiment, the second weighting factor is four (4).

Step S310 is followed by step S312 where the green pixels with a distance of two (2) pixels from the CGP G22 are assigned a third weighting factor. These nearby pixels with a distance of 2 pixels will hereby be referred to as "GP2" and together define a second tier layer. In the exemplary embodiment, there are 8 GP2s in the second tier layer indexed as G00, G02, G04, G20, G24, G40, G42 and G44 and each gets a weighting factor of one (1). Therefore, the overall weighting factor is 32, so normalization can be easily done by downshift of 5 bits or division by $2^5$ wherein the pixel values maybe represented by 8, 10 or 12 bits using a binary representation. Normalization will be described later.

Step S312 is followed by step S314 where F-max, F_min are set and calculated. F_max is the upper bound threshold of the ratio of max Green mismatch. F_min is the lower bound threshold of the ratio of max Green mismatch. Step 314 is followed by Step 316 where an Offset is calculated wherein the offset is the intensity threshold of performing smoothing.

Figure 13B:
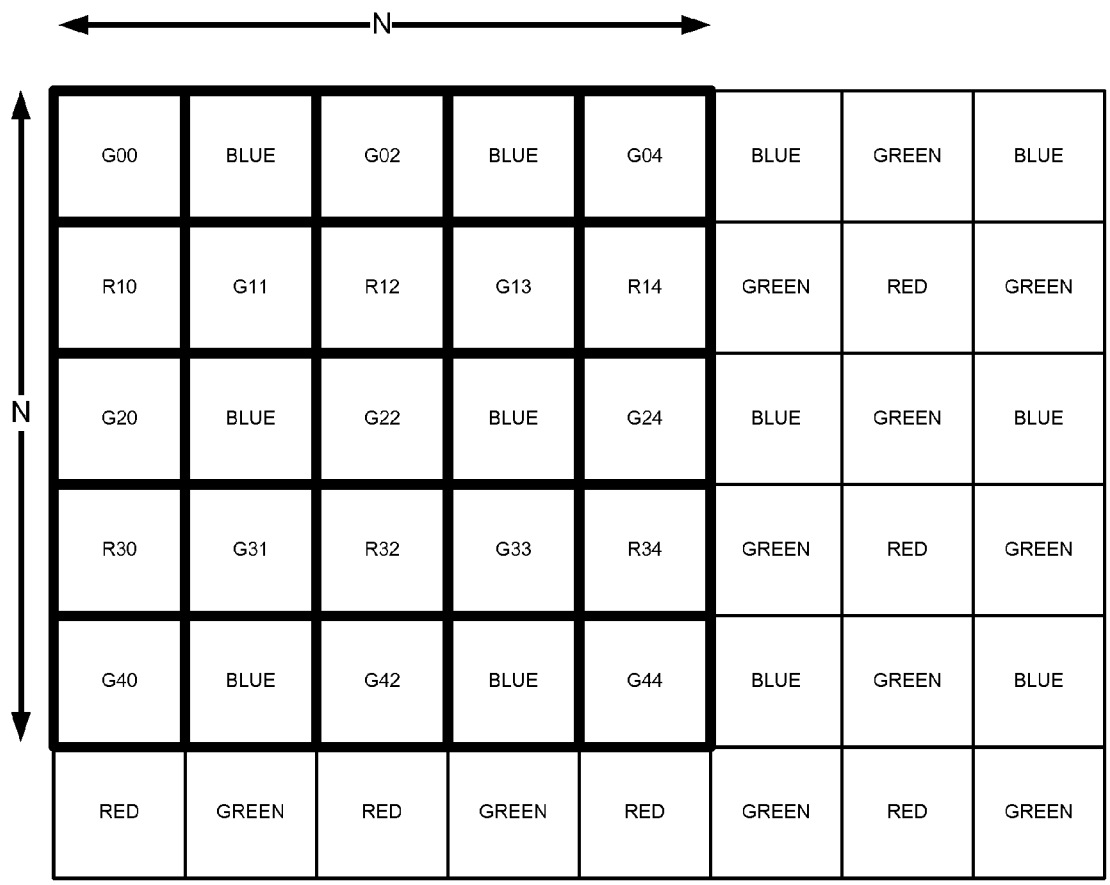
FIG. 13B illustrates a bayer pattern with Green pixel indexing and Red pixel indexing.

One important factor of the green channel mismatch is due to the cross talk of the surrounding red pixels. That is, the Gr/Gb channel variance depends on the red channel value. Therefore, the Offset is adaptive to the surrounding red pixels to remove the spatial variant green channel odd-even mismatch accurately. In the exemplary embodiment the surrounding red pixels are index and denoted as R10, R12, R14, R30, R32, and R34 (FIG. 13B). In the exemplary embodiment, there are six (6) surrounding red pixels. The Offset parameter is defined by equation Eq. (6) as:

$$\text{Offset}=k*\text{mean}(R10,R12,R14,R30,R32,R34) \quad \text{Eq. (6)}$$

where k is a parameter that adjusts the magnitude of the correction for cross talk; and R10, R12, R14, R30, R32, R34 denote the pixel value for the corresponding indexed red pixel.

In addition, the Offset is capped by a constant denoted as Offset Cap to avoid an overly large offset threshold. Therefore, step S316 is followed by step S317 wherein if Offset is greater than the Offset Cap, the Offset is set to Offset Cap or other constant at step S318. Step S318 is followed by step S319. However, if the Offset is not greater than the Offset Cap then Step S317 is followed by step S319.

At step S319, for the CGP G22, the variables P_max, P_min and G_sum are computed by equations Eq. (7), Eq. (8) and Eq. (9a) defined as:

$$P\_max = max(F\_max*G22, G22+offset); \qquad \text{Eq. (7)}$$

$$P\_min = min(F\_min*G22, G22-offset); \text{ and} \qquad \text{Eq. (8)}$$

$$G\_sum = G22 << 3 \qquad \text{Eq. (9a)}$$

where G22 denotes the green pixel value for the center pixel G22; P_max is a maximum value for the green pixel; and P_min is a minimum value of a green pixel. Furthermore, the symbol "<<" denotes an upshift of 3 bits. In other words, G_sum is equal to the pixel value of the green center pixel G22 multiplied by its weighing factor 8 ($2^3$). Thus, equation Eq. (9a) can also be written as equation Eq. 9(b) defined as:

$$G\_sum = \text{pixel value of } G22 * \text{weighting factor for } G22. \qquad \text{Eq. 9(b)}$$

As can be readily seen, G-sum in Eq. (9a) or Eq. (9b) generates a weighted center green pixel value based on a first weighting factor for the center green pixel (CGP) G22.

Step S319 is followed by step S320 where the first green pixel at distance 1 from the center green pixel (CGP) G22 is obtained in the first tier layer. Step S320 is followed by step S322 where a determination is made whether the pixel value for the green pixel GP1 is greater than or equal to P_min and is less than or equal to P_max (see step S322). In other words, step S322 determines whether the green pixel under evaluation is within range. If the determination at step S322 is "YES," step S322 is followed by step S324 where the value G_sum is increased by the green pixel value of the first green pixel GP1 (such as indexed pixel G11) upshifted by 2 bits to produce a weighted pixel value for the first tier layer. More specifically, the G_sum is increased by the equations Eq. (10a) or Eq. (10b):

$$G\_sum += GP1 << 2; \text{or} \qquad \text{Eq. (10a)}$$

$$G\_sum = G\_sum + (GP1 * \text{weighting factor of } GP1); \qquad \text{Eq. (10b)}$$

(weighting factor for the first tier layer,=4)
wherein GP1 is the pixel value for the indexed green pixel in the first tier layer surrounding the center green pixel. In the exemplary embodiment, the GP1s in the first tier layer include G11, G13, G31 and G33. As a result, G_sum of Eq. (10a) or Eq. (10b) is increased by the pixel value of each GP1 (G11, G13, G31 and G33) multiplied by the first tier layer weighing factor (4) or ($2^2$) if the green pixel value GP1 under evaluation is within range defined by P_min and P_max.

On the other hand, if the determination at step S322 is "NO," then the pixel value for the green pixel GP1 is not greater than or equal to P_min and/or not less than or equal to P_max. In other words, the green pixel value GP1 under evaluation is out-of-range. Thus, step S322 is followed by step S326 where the value G_sum is increased by the pixel value of the center green pixel value denoted as G22 upshifted by 2. More specifically, the G_sum is increased by equations Eq. (11 a) or Eq. (11 b):

$$G\_sum += G22 << 2; \text{ or} \qquad \text{Eq. (11a)}$$

$$G\_sum = G\_sum + (G22 * \text{weighting factor of } GP1) \qquad \text{Eq. (11b)}$$

(weighting factor for the first tier layer,=4)
wherein G22 denotes the pixel value for indexed center green pixel G22. The same operation and weighting are given to G13, G31 and G33 of the first tier layer. The G_sum equation at Eq. (11a) or Eq. (11b) is used if the green pixel value GP1 under evaluation is out of the range defined by P_min and P_max. As can be readily seen in Eq. (11 a) or Eq. (11 b) the out of range green pixels of the tier layer are replaced with the pixel value of the center green pixel G22.

Steps S324 and S326 are followed by steps S328 to determine if there is another GP1. If so, step S328 returns to step S320 so that steps S322, S324, S326 are reevaluated based on the pixel values for the next GP1.

At the end of the loop defined by steps S320, S322, S324, S326 and S328, the G_sum of Eqs. (10a), (10b), (11a) and/or 11(b) has added together the weighted green pixel values of the first tier layer which in general forms a first tier layer sum. In the proposed program code provided, the G_sum equations also add the first tier layer sum to the previously calculated G_sum for the weighted center green pixel value.

When there are no more GP1s in the first tier layer, step S328 is followed by step S330 where the first green pixel at distance 2 from the center green pixel (CGP) G22 is obtained in the second tier layer. The step S330 is followed by step S332 where a determination is made whether the pixel value for the green pixel GP2 is greater than or equal to P_min and is less than or equal to P_max (see step S332) or in range. If the determination at step S332 is "YES," step S332 is followed by step S334 where the value G_sum is increased by the green pixel value of the first green pixel GP2 (such as indexed pixel G00). More specifically, the G_sum is increased by the equations Eq. (12a) or Eq. (12b):

$$G\_sum += GP2; \text{ or} \qquad \text{Eq. (12a)}$$

$$G\_sum = G\_sum + GP2 * \text{weighting factor of } GP2 \qquad \text{Eq. (12b)}$$

(weighting factor for the second tier layer,=1)
wherein GP2 is the pixel value for the indexed green pixel in the second tier layer. In the exemplary embodiment, the GP2s in the second tier layer include G00, G02, G04, G20, G24, G42, and G44. As a result, G_sum is increased by the pixel value of the GP2 since the weighting factor is 1 if the green pixel value GP2 under evaluation is within the range defined by P_min and P_max.

On the other hand, if the determination at step S332 is that the pixel value for the green pixel GP2 is not greater than or equal to P_min and/or not less than or equal to P_max or out-of-range, then step S332 is followed by step S336 where the value G_sum is increased by the pixel value of the center green pixel value denoted as G22. More specifically, the G_sum is increased by equations Eq. (13a) or Eq. (13b):

$$G\_sum += G22; \text{ or} \qquad \text{Eq. (13a)}$$

$$G\_sum = G\_sum + (G22 * \text{weight factor of } GP2) \qquad \text{Eq. (13b)}$$

(weighting factor for the second tier layer,=1)
wherein G22 denotes the pixel value for indexed center green pixel G22. The same operation and weighting are given to the GP2s denoted as G00, G02, G04, G20, G24, G42, and G44 in the second tier layer. The G_sum equation at Eq. (13a) or Eq. (13b) is used if the green pixel value GP2 under evaluation is out-of-range defined by P_min and P_max. Thus, the green pixel value of the out of range green pixels in the second tier layer are replaced with the pixel value of the center green pixel G22.

As can be readily seen, Eqs. (12a), (12b), (13a) and/or 13(b) sum the weighted pixel values of the second tier layer.

Steps S334 and step S336 are followed by steps S338 to determine if there is another GP2. If so, step S338 returns to step S330 wherein steps S332, S334, S336 are reevaluated based on the pixel values for the next GP2. At the end of the loop defined by steps S330, S332, S334, S336 and S338, G_sum has added together the weighted green pixel values of the second tier layer which forms a second tier layer sum. In the proposed program code provided, G_sum has also added together the second tier layer sum, the first tier layer sum and the weighted center green pixel value to form a weighted green pixel sum total.

Figure 14A:
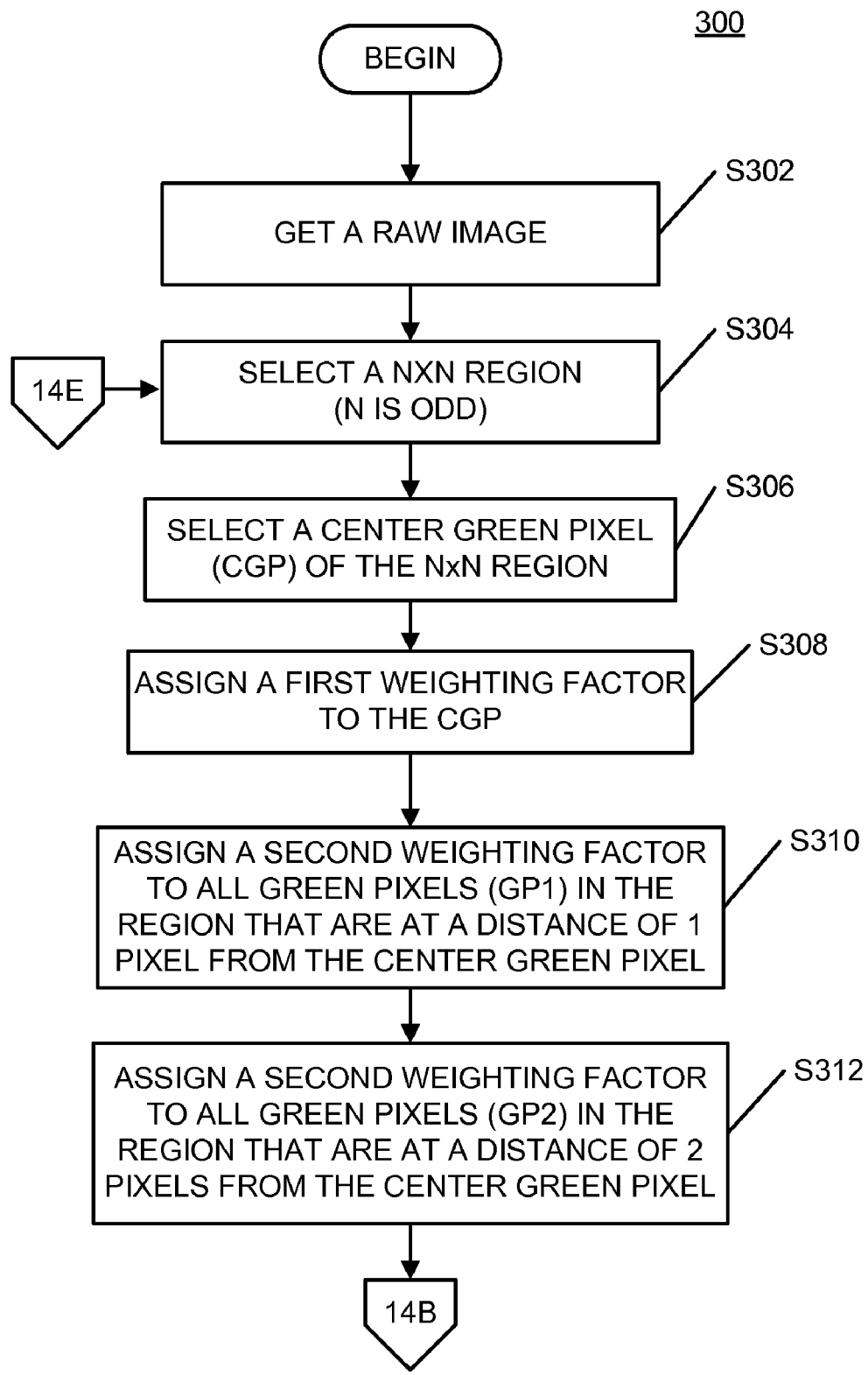
FIGS. 14A-14E illustrate flowcharts for an alternative adaptive green channel odd-even mismatch removal method for adaptive channel balancing.
Figure 14B:
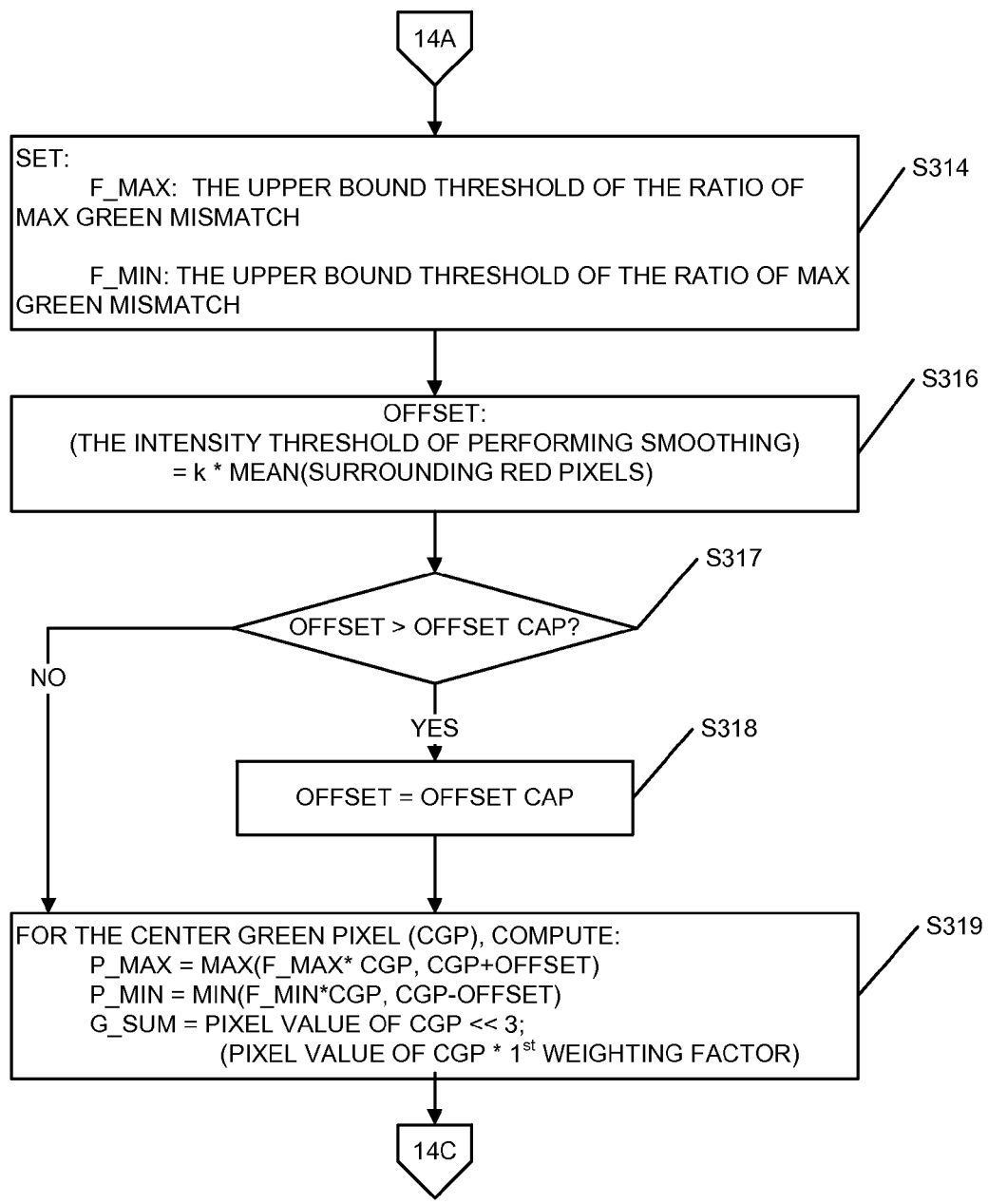
Figure 14C:
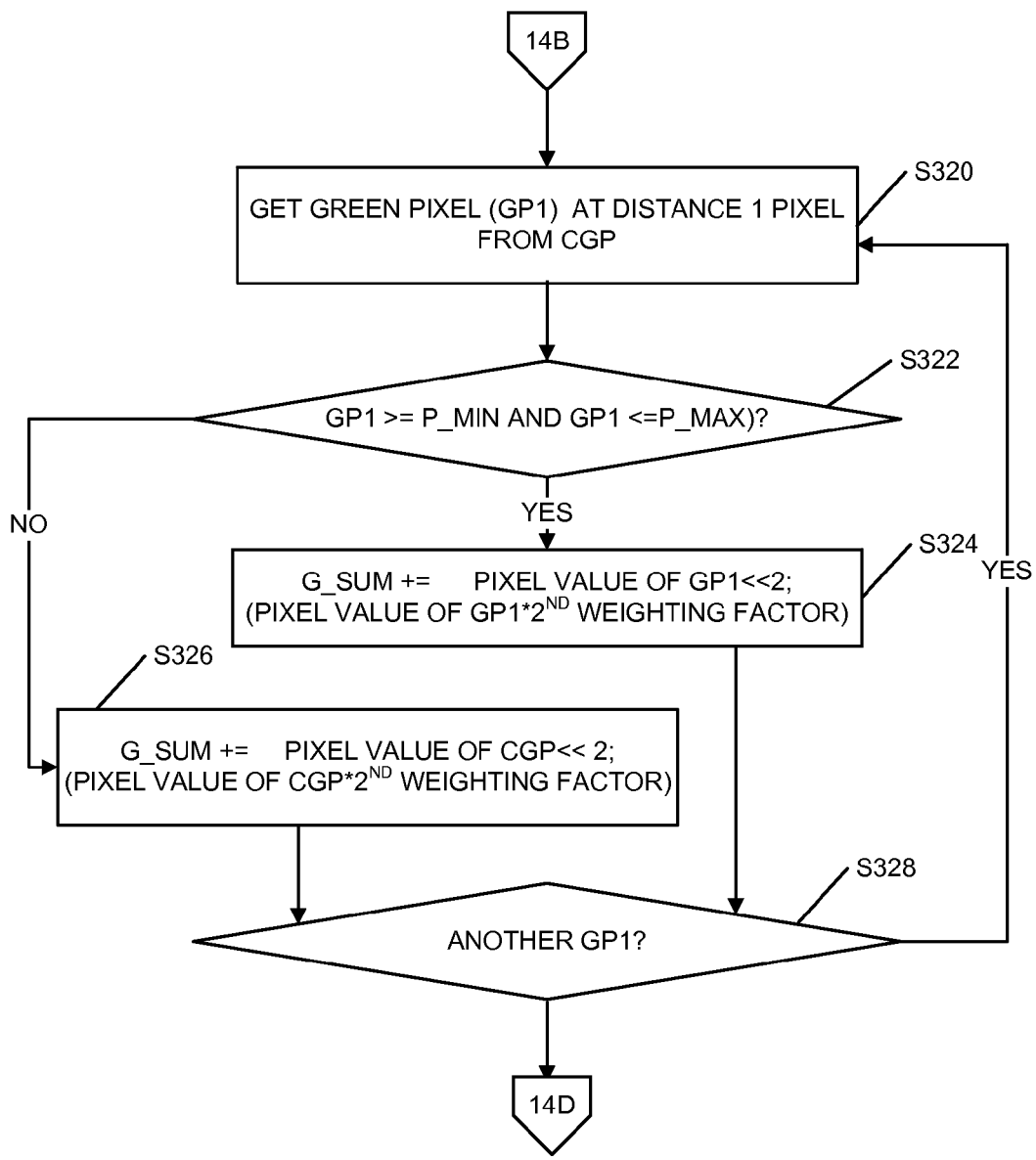
Figure 14D:
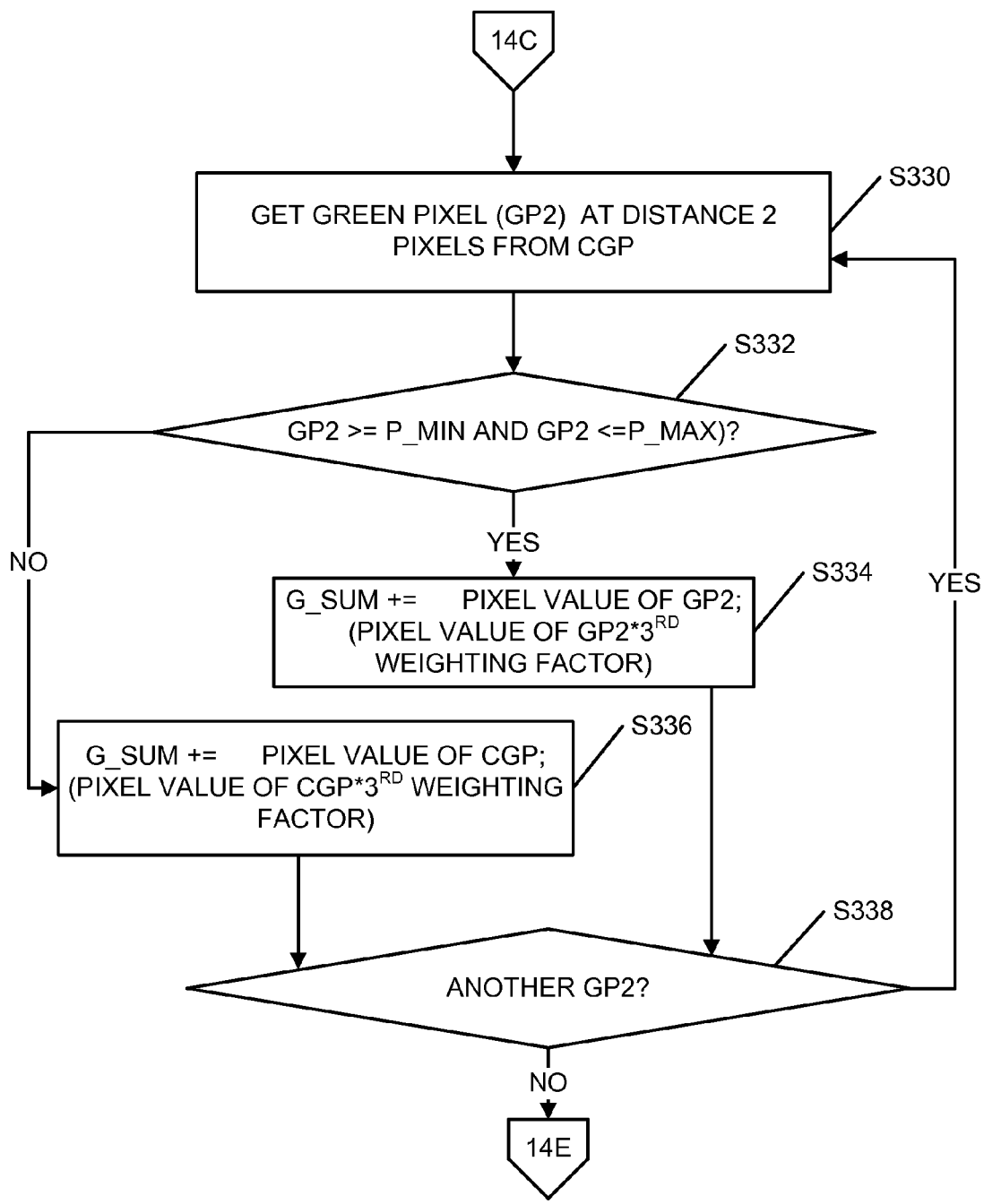
Figure 14E:
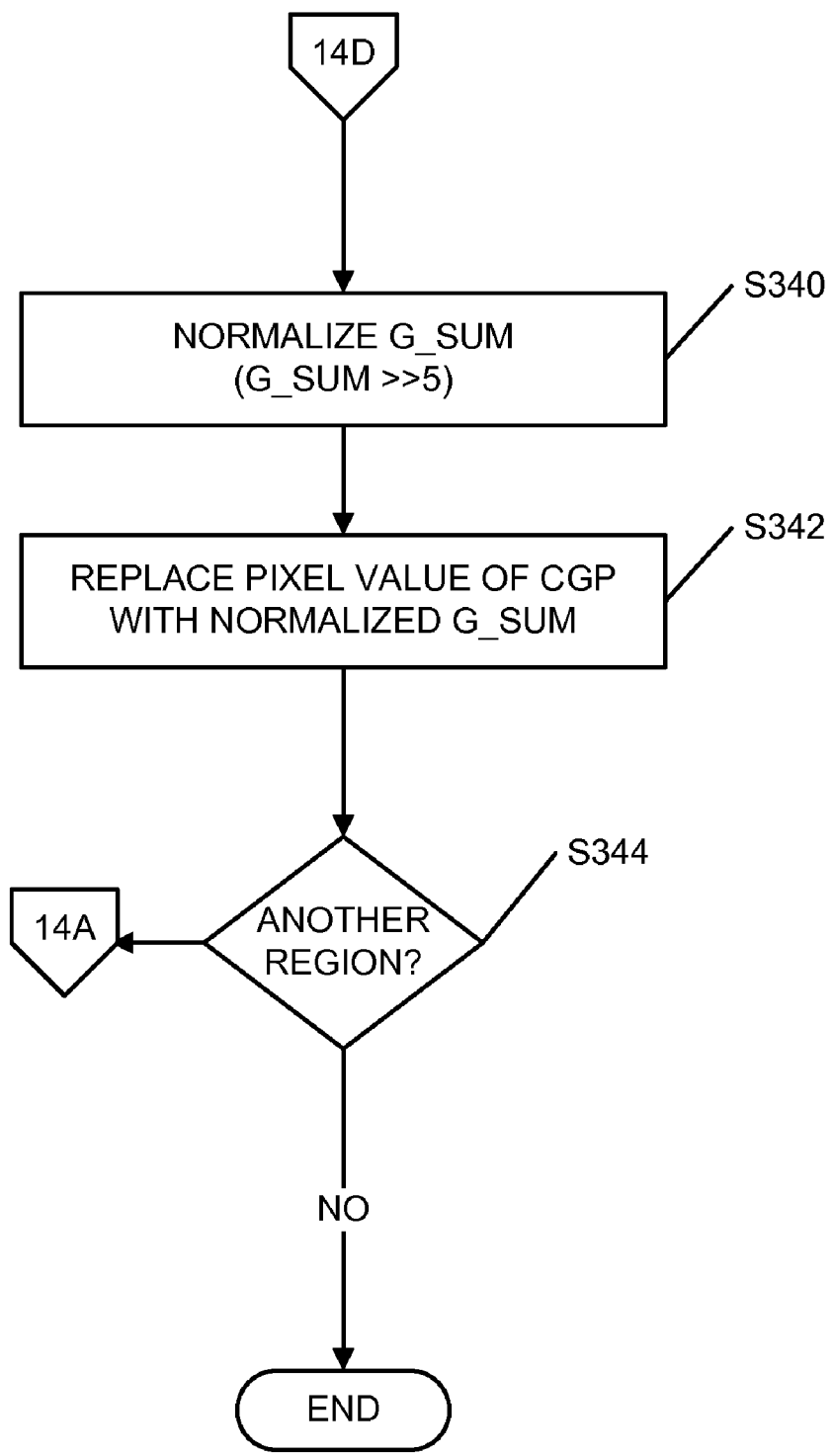

Referring now to FIG. 14E, after the green pixels in the N×N (N=5) region are processed, the G_sum (weighted green pixel sum total) is normalized at step S340. G_sum (weighted green pixel sum total is normalized by downshifting the G_sum by 5 bits ($2^5$=total weighting factor 32 for a binary representation). The total weighting factor equals the sum total of the first weighting factor, the second weighting factor multiplied by the number of green pixels in the first tier layer and the third weighting factor multiplied by the number of green pixels in the second tier layer. In the exemplary embodiment, the first weighting factor is 8. The second weighting factor multiplied by the number of green pixels in the first tier layer equals 16. The third weighting factor multiplied by the number of green pixels in the second tier layer equals 8.

At step S342, the pixel value of the center green pixel G22 is replaced with the normalized G_sum calculated in step S340. More specifically, the new pixel value of the center green pixel (G22) is defined by the equation Eq. (14)

$$\text{New G22}=\text{G\_sum}>>5;\qquad\text{Eq. (14)}$$

where G22 denotes the pixel value for the center green pixel G22 and the symbol ">>" denotes downshifting; and G_sum in Eq. (14) is the weighted green pixel sum total. Downshifting by 5 bits is the same as dividing by $2^5$ or 32.

With the adaptive green channel odd-even mismatch removal method 300, for the green pixels that are close to the center green pixel G22, they are used to perform lowpass filtering. If the green pixels are beyond the range of the defined closeness, they are skipped (replaced with the pixel value of the center green pixel). In the exemplary embodiment, the defined closeness is the pixels at the distance of one (1) pixel or at the distance of two (2) pixels. Thus, the normalization factor is a constant. Therefore, division can be replaced with a simple downshift.

Step 342 is followed by step S344 where the method 300 is repeated for the next region of the image until there are no more regions. At step S344, if the determination is "NO," the method 300 ends since there are no more regions. On the other hand, if the determination is "YES," step S344 loop back to step S304 in FIG. 14A to repeat the process for the next region of the whole frame image.

Alternately, step S344 can be moved to a location before the normalization step S340 which would allow all center pixels to be normalized at the same time.

Note that the values P_max and P_min utilize both ratio and Offset parameters. For small signals, the ratio can not produce a useful range. With the help of the Offset, it can provide a meaningful range of [P_min, P_max]. The side benefit is the reduction of noise as well. For large signals, the ratio dominates and matches the calibrated worst Gr/Gb ratio mismatch which is estimated from the bright grey signal during the calibration process.

With the adaptive green channel odd-even mismatch removal method 300, only the worst mismatch of the sensor (such as sensor module 210) has to be known as a prior knowledge. At the run time, there is no parameter to change or tune. The worst mismatch is known during the sensor calibration procedure.

Figure 15A:
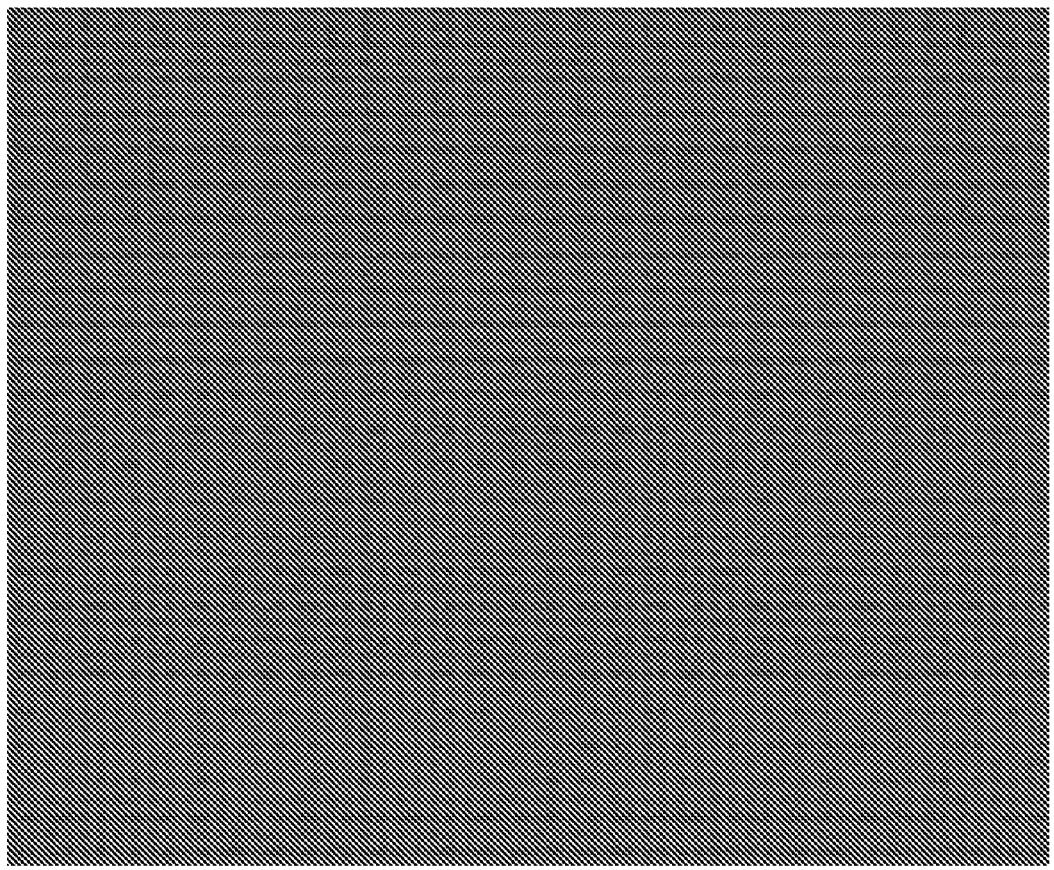
FIG. 15A illustrates a flat field image without the adaptive channel balancing (zoomed 300% and with demosaic processing)
Figure 15B:
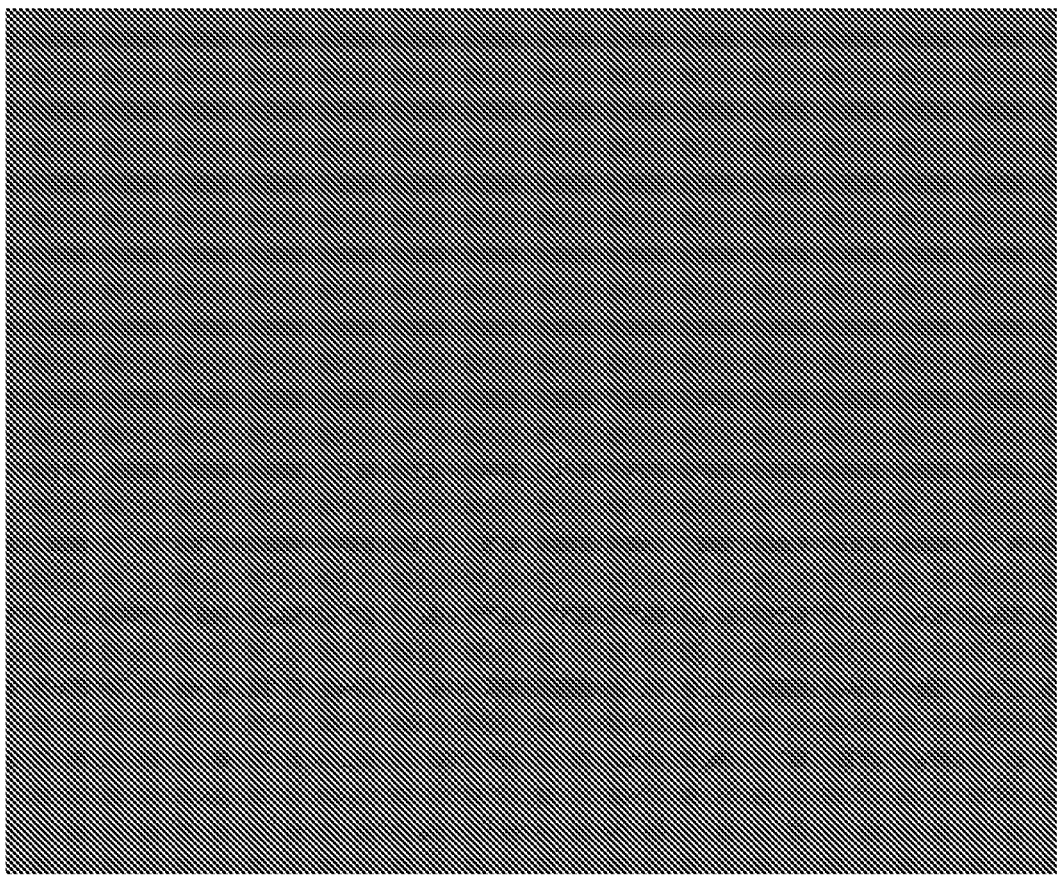
FIG. 15B illustrates a flat field image with the adaptive channel balancing (zoomed 300% and with demosaic processing)
Figure 16A:
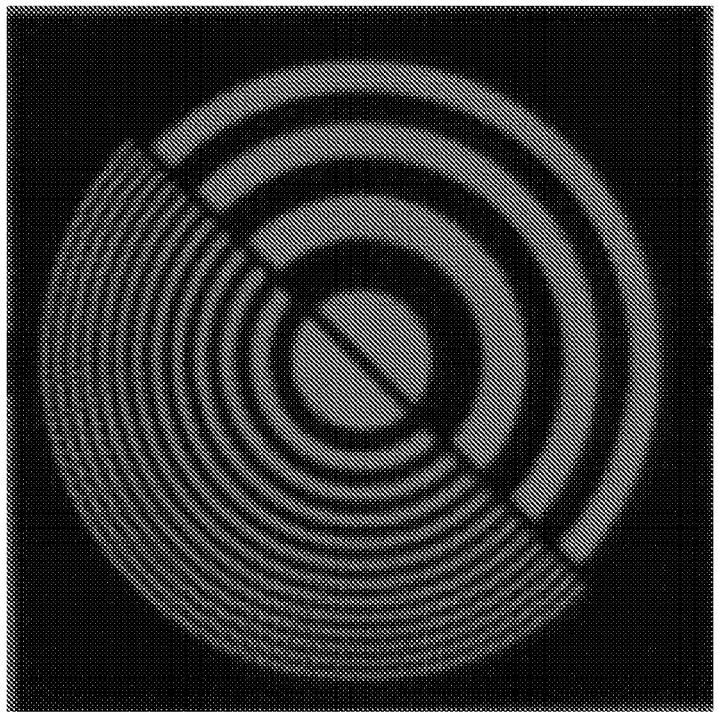
FIG. 16A illustrates a resolution chart image (center circles) without the adaptive channel balancing (zoomed 300% and with demosaic processing)
Figure 16B:
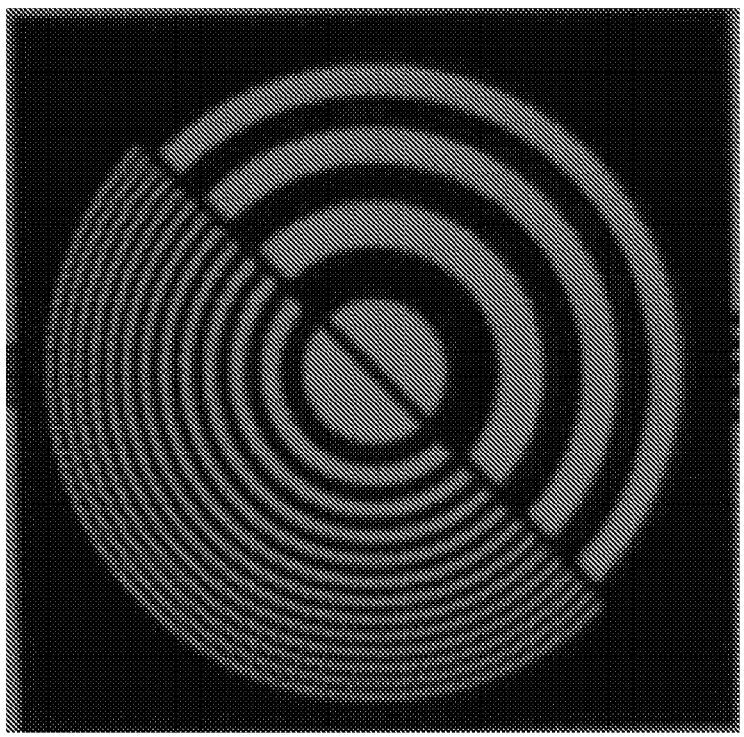
FIG. 16B illustrates a resolution chart image (center circles) with the adaptive channel balancing (zoomed 300% and with demosaic processing)
Figure 17A:
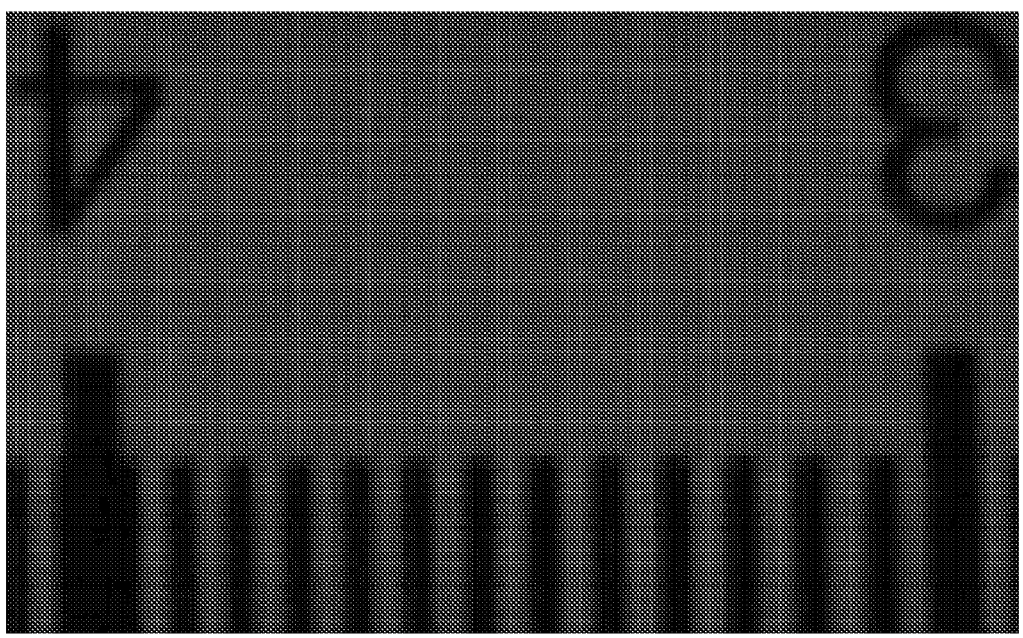
FIG. 17A illustrates a resolution chart image (vertical lines) without the adaptive channel balancing (zoomed 300% and with demosaic processing)
Figure 17B:
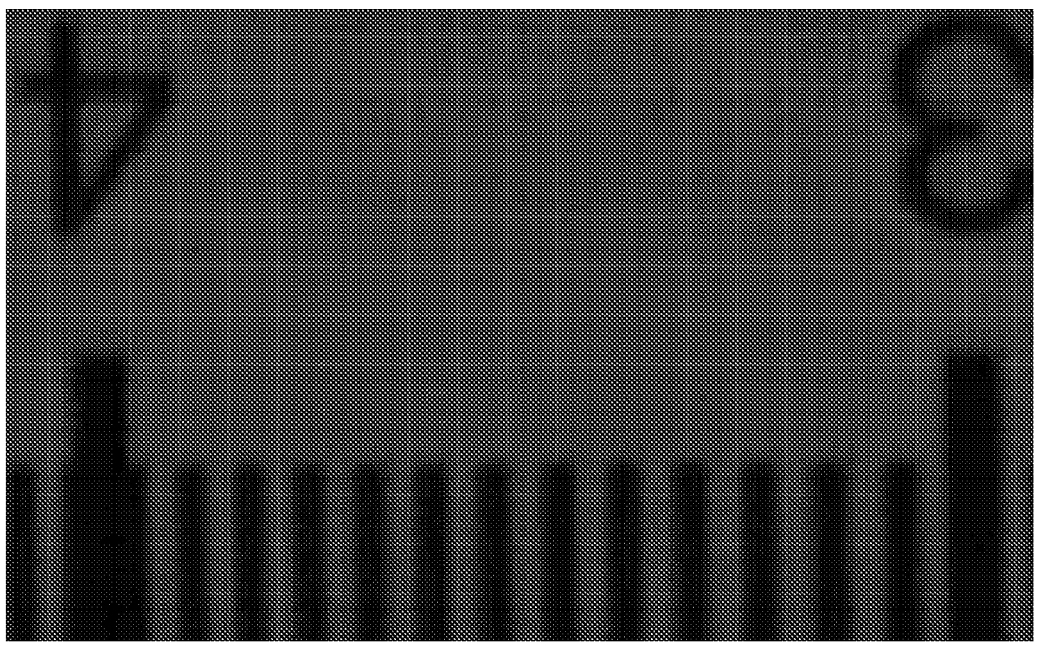
FIG. 17B illustrates a resolution chart image (vertical lines) with the adaptive channel balancing (zoomed 300% and with demosaic processing)
Figure 18A:
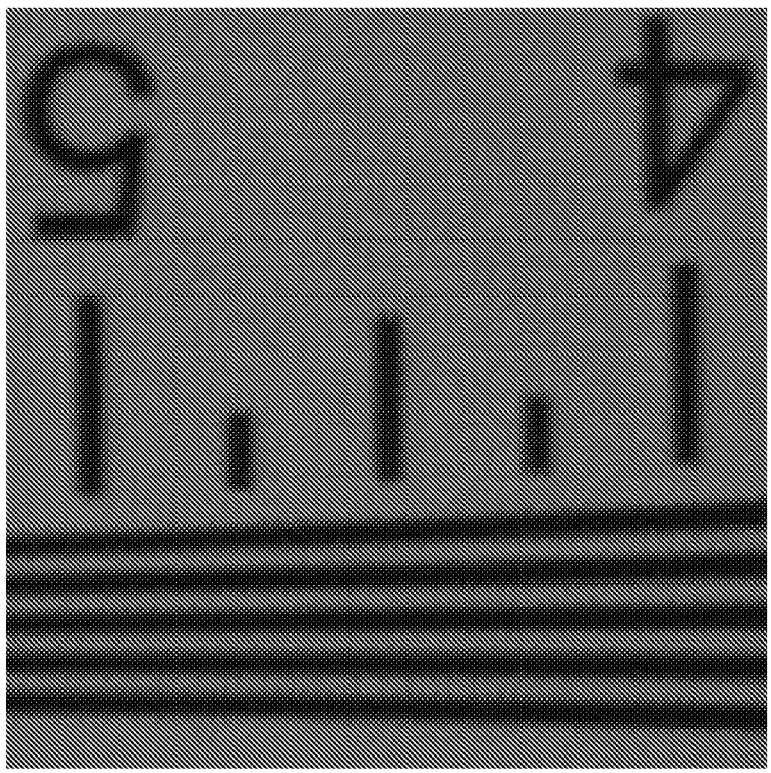
FIG. 18A illustrates a resolution chart image (horizontal lines) without the adaptive channel balancing (zoomed 300% and with demosaic processing)
Figure 18B:
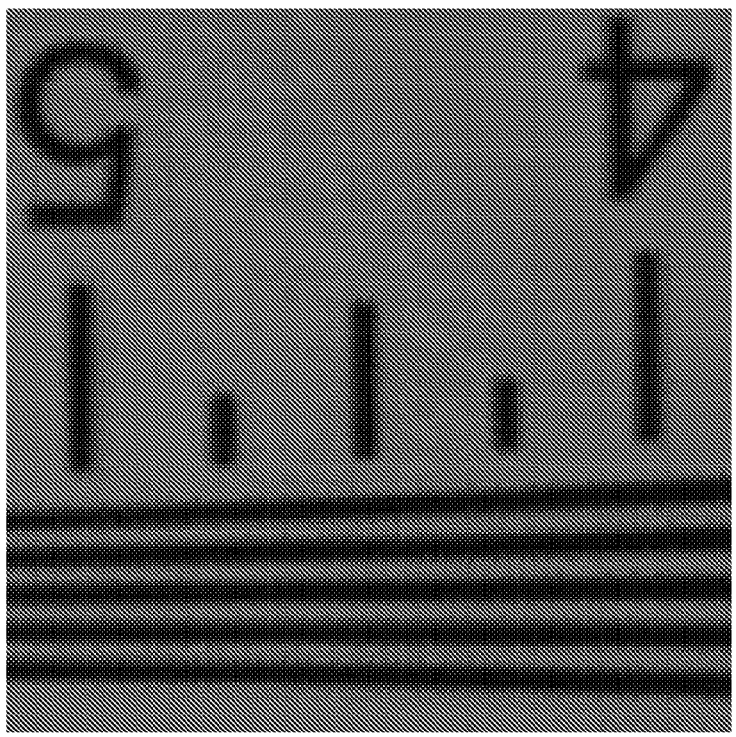
FIG. 18B illustrates a resolution chart image (horizontal lines) with the adaptive channel balancing (zoomed 300% and with demosaic processing)
Figure 19A:
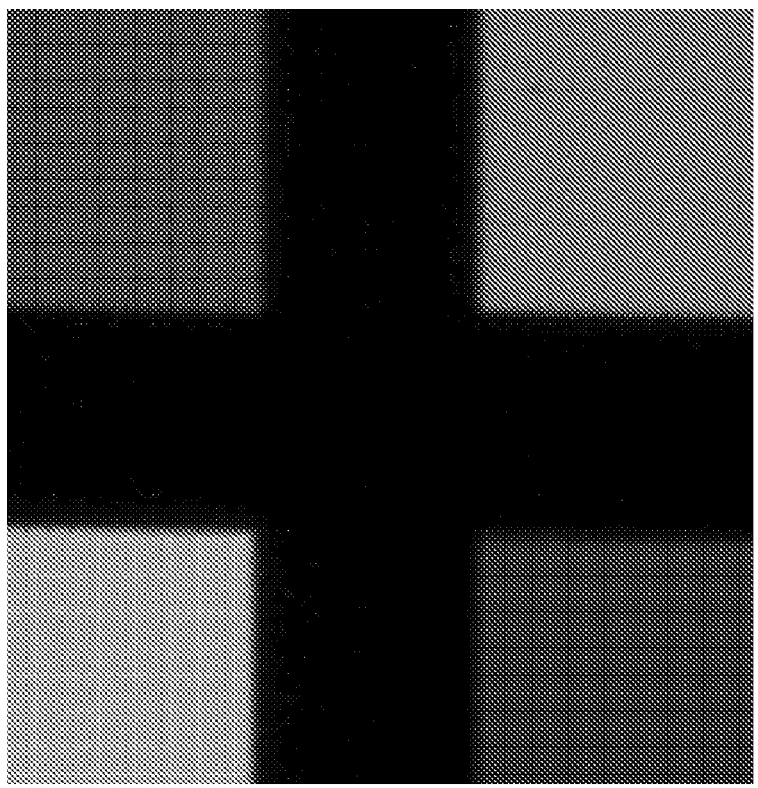
FIG. 19A illustrates a MacBeth chart image without the adaptive channel balancing (zoomed 300% and with demosaic processing)
Figure 19B:
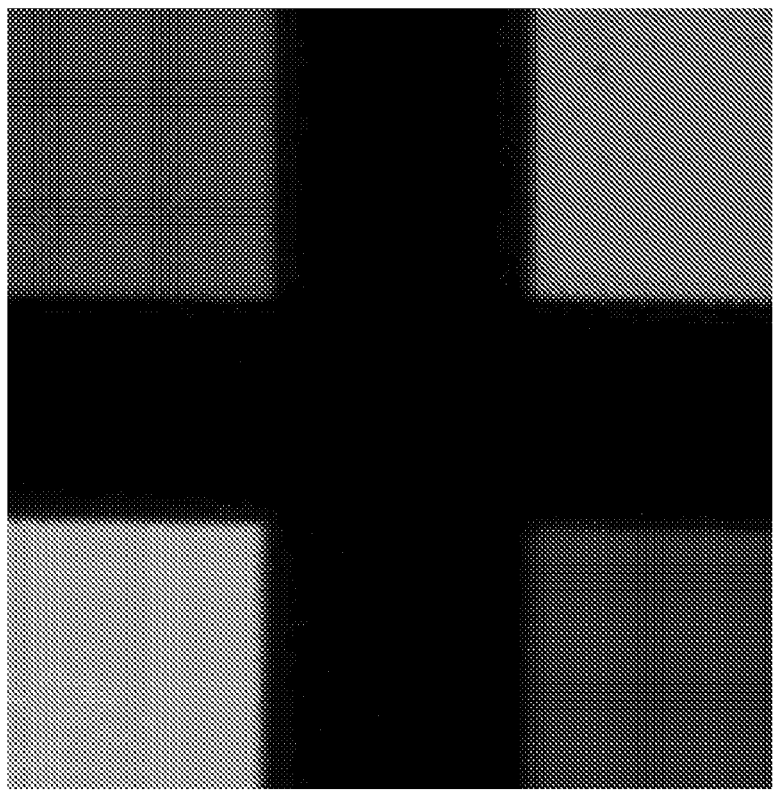
FIG. 19B illustrates a MacBeth chart image with the adaptive channel balancing algorithm (zoomed 300% and with demosaic processing)
Figure 20A:
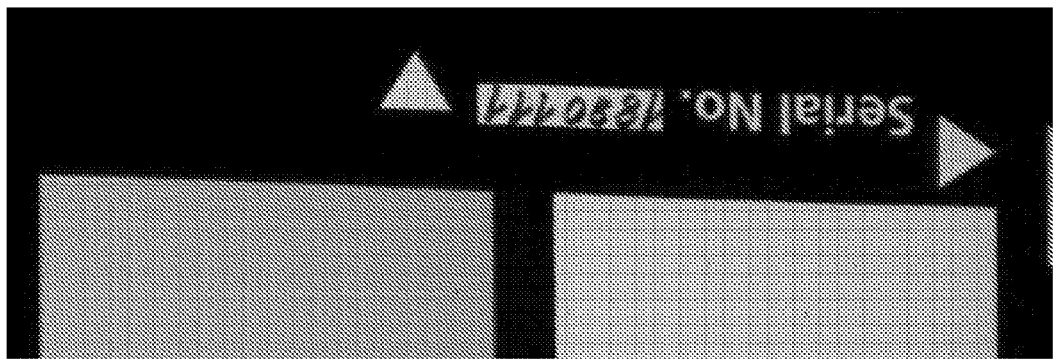
FIG. 20A illustrates a MacBeth chart image without the adaptive channel balancing and with demosaic processing.
Figure 20B:
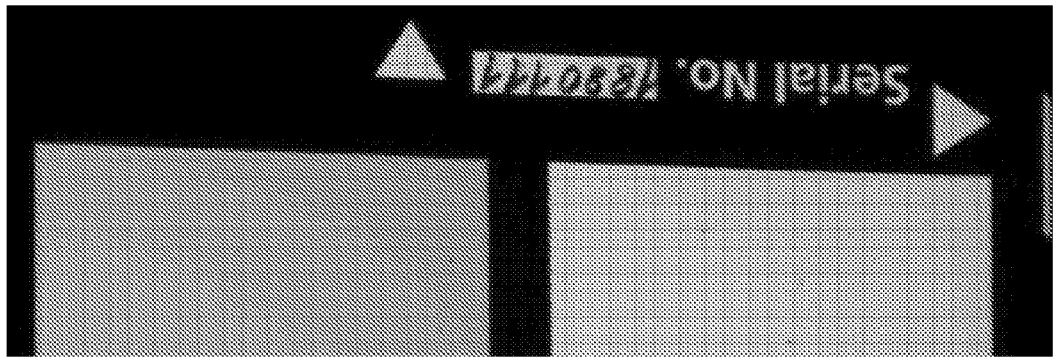
FIG. 20B illustrates a MacBeth chart image with the adaptive channel balancing and with demosaic processing.

Experimental Results:

The FIGS. 15A, 15B, 16A, 16B, 17A, 17B, 18A, 18B, 19A, 19B, 20A and 20B show comparisons of images with and without the adaptive green channel odd-even mismatch removal method 300, with demosaic processing. It can be easily seen that with the adaptive green channel odd-even mismatch removal method 300 (hereinafter referred to as an "adaptive green channel balancing method"), the high frequency components (sharp lines and curves) are preserved very well and the cross hatched pattern is removed. No new artifact is introduced into the image with the adaptive green channel balancing method. The images of FIGS. 15A, 15B, 16A, 16B, 17A, 17B, 18A, 18B, 19A, 19B, 20A and 20B are processed with F_max=1.13, F_min=0.87 and Offset limited to 5. FIGS. 15A-15B illustrate a flat field image without and with the adaptive green channel balancing method (zoomed 300% and with demosaic); FIGS. 16A-16B illustrate a resolution chart image (center circles) without and with the adaptive green channel balancing method (zoomed 300% and with demosaic processing); FIGS. 17A-17B illustrate a resolution chart image (vertical lines) without and with the adaptive green channel balancing method (zoomed 300% and with demosaic processing); FIGS. 18A-18B illustrate a resolution chart image (horizontal lines) without and with the adaptive green channel balancing method (zoomed 300% and with demosaic processing); FIGS. 19A-19B illustrate a MacBeth chart image without and with the adaptive channel balancing algorithm (zoomed 300% and with demosaic processing); and FIGS. 20A-20B illustrate a MacBeth chart image without and with the adaptive channel balancing (with demosaic processing).

As can be readily seen from FIGS. 15B, 16B, 17B, 18B, 19B and 20B, the adaptive green channel balancing method 300 preserves the edges in the image very well while the odd-even mismatch artifact (cross hatched pattern) can be removed. The adaptive green channel balancing method 300 does not need to have run-time tuning or supervision. Only the off-line calibration of the worst odd-even mismatch is required to determine the parameters (F_max and F_min) used in the adaptive green channel balancing method 300. The calibration procedure will provide the green channel mismatch gain and the gain variance. Based on that, the parameters (F_max and F_min) can be derived.

The adaptive green channel balancing method 300 is suitable to be implemented in hardware, firmware or software.

The foregoing description of the embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

APPENDIX

The Gr_avg and Gb_avg values for the non-bad green pixels within the region are computed according to the following procedure:

```
For(i=0; i<Number of Valid Pairs per Region; i++)
{
    Gr_sum += GR;
    Gb_sum += GB;
}
Gr_avg = Gr_sum/ Number of Valid Pairs per Region;
Gb_avg = Gb_sum/ Number of Valid Pairs per Region.
```

The channel gain of each (GB, GR) pair could be derived using the pseudo code:

```
avg = (Gr_avg + Gb_avg)/2;
Gr_gain = avg/GR_avg;
Gb_gain = avg/GB_avg.
```

The following code may be used for the alternative adaptive green channel odd-even mismatch removal method 300.

```
P_max = max (F_max * G22, G22+offset);
P_min = min (F_min * G22, G22−offset); and
G_sum = G22 <<3.
```

The following exemplary code may be used for the alternative adaptive green channel odd-even mismatch removal method 300 for summing the parameter G_sum based on for green pixels at a distance of 1 from the green center pixel in the first tier layer.

```
For G11,
    If ( G11>=P_min and G11<=P_max)
        G_sum += G11 <<2;    (weighting =4)
    Else
        G_sum += G22 << 2.
```

The same operation and weighting are given to G13, G31 and G33.

The following exemplary code may be used for the alternative adaptive green channel odd-even mismatch removal method 300 for summing the parameter G_sum based on for green pixels at a distance of 2 from the green center pixel in the second tier layer.

```
For G00,
    If ( G00>=P_min and G00<=P_max)
        G_sum += G00;    (weighting =1)
    Else
        G_sum += G22.
```

The same operation and weighting are given to G02, G04, G20, G24, G40, G42 and G44.

We claim:

1. A method for adaptive green channel odd-even mismatch removal, the method comprising:
    dividing a raw image from a sensor into a plurality of regions; and for each region of the plurality of regions:
    removing green channel odd-even mismatch in the raw image by applying a gain to green pixels of the raw image to effectuate the disappearance of artifacts present in a demosaic processed image generated from the raw image;
    generating a weighted center green pixel value based on a first weighting factor for a center green pixel of a region;
    summing weighted green pixel values for green pixels surrounding the center green pixel based on a second weighting factor in a first tier layer with respect to the center green pixel of the region to form a first tier layer sum;
    summing weighted green pixel values for green pixels surrounding the center green pixel based on a third weighting factor in a second tier layer with respect to the center green pixel of the region to form a second tier layer sum;
    summing the weighted center green pixel value, the first tier layer sum and the second tier layer sum to form a weighted green pixel sum total;
    normalizing the weighted green pixel sum total; and
    replacing a pixel value of the center green pixel with the normalized weighted green pixel sum total.

2. The method of claim 1; further comprising multiplying the center green pixel value by the first weighting factor to generate the weighted center green pixel value.

3. The method of claim 1; further comprising,
    prior to the summing step for the first tier layer,
        comparing a pixel value for each green pixel in the first tier layer to a pixel maximum and a pixel minimum to determine if the pixel value for each green pixel in the first tier layer is within a range;
        for each green pixel in the first tier layer within the range, multiplying the pixel value of each green pixel by the first weighting factor to form a corresponding within-range weighted green pixel value; and
        for each green pixel in the first tier layer not within the range, multiplying the center green pixel value by the first weighting factor to form a corresponding out-of-range weighted green pixel value;
        wherein summing the first tier layer includes summing the within-range weighted green pixel value for all green pixels in the first tier layer that are within the range, and summing the out-of-range weighted green pixel value for all green pixels in the first tier layer that are out of the range.

4. The method of claim 3; further comprising,
    prior to the summing step for the second tier layer,
        comparing a pixel value for each green pixel in the second tier layer to the pixel maximum and the pixel minimum to determine if the pixel value for each green pixel in the second tier layer is within the range;
        for each green pixel in the second tier layer within the range, multiplying the pixel value of each green pixel by the second weighting factor to form a corresponding within-range weighted green pixel value; and
        for each green pixel in the second tier layer not within the range, multiplying the center green pixel value by the second weighting factor to form a corresponding out-of-range weighted green pixel value; and wherein summing the second tier layer includes summing the within-range weighted green pixel values for all green pixels in the second tier layer that are within the range, and summing the out-of-range weighted green pixel values for all green pixels in the second tier layer that are out of the range.

5. The method of claim 3; further comprising setting an upper bound Green mismatch F_max value comprising a ratio of Gr/Gb;

setting a lower bound Green mismatch F_min value comprising a second ratio of Gr/Gb;

calculating an offset adaptive to red pixels surrounding the center green pixel (CGP) to remove spatial variant green channel odd-even mismatch;

calculating the pixel maximum P_max based on an equation defined as $$P\_max = \max(F\_max * CGP, CGP + \text{offset}); \text{ and}$$

calculating the pixel minimum P_min based on an equation defined as $$P\_min = \min(F\_min * CGP, CGP - \text{offset}).$$

6. The method of claim 5; further comprising multiplying a mean of red pixel values for red pixels surrounding each green pixel by a k parameter that adjusts a magnitude of correction for cross talk.

7. An adaptive green channel odd-even mismatch removal module comprising:

means for dividing a raw image from a sensor into a plurality of regions;

means for removing green channel odd-even mismatch in each region of the plurality of regions in the raw image by applying a gain to green pixels of the raw image to effectuate the disappearance of artifacts present in a demosaic processed image generated from the raw image;

means for determining a green (GR) channel gain for green pixels located in red rows and a green (GB) channel gain for green pixels located in blue rows in each region of the plurality of regions to remove green channel odd-even mismatch;

means for applying the GR channel gain to the green pixels located in the red rows and the GB channel gain to the green pixels located in the blue rows in each region of the plurality of regions;

means for generating a weighted center green pixel value based on a first weighting factor for a center green pixel of a region;

means for summing weighted green pixel values for green pixels surrounding the center green pixel based on a second weighting factor in a first tier layer with respect to the center green pixel of the region to form a first tier layer sum;

means for summing weighted green pixel values for green pixels surrounding the center green pixel based on a third weighting factor in a second tier layer with respect to the center green pixel of the region to form a second tier layer sum;

means for summing the weighted center green pixel value, the first tier layer sum and the second tier layer sum to form a weighted green pixel sum total;

means for normalizing the weighted green pixel sum total; and means for replacing a pixel value of the center green pixel with the normalized weighted green pixel sum total.

8. The module of claim 7 further comprising means for multiplying the center green pixel value by the first weighting factor to generate the weighted center green pixel value.

9. The module of claim 7; further comprising, means for comparing a pixel value for each green pixel in the first tier layer to a pixel maximum and a pixel minimum to determine if the pixel value for each green pixel in the first tier layer is within a range;

means for multiplying, for each green pixel in the first tier layer within the range, the pixel value of each green pixel by the first weighting factor to form a corresponding within-range weighted green pixel value;

means for multiplying, for each green pixel in the first tier layer not within the range, the center green pixel value by the first weighting factor to form a corresponding out-of-range weighted green pixel value; and wherein the summing means for the first tier layer sums the within-range weighted green pixel values for all green pixels in the first tier layer that are within the range, and sums the out-of-range weighted green pixel values for all green pixels in the first tier layer that are out of the range.

10. The module of claim 9; further comprising:

means for comparing, prior to the summing for the second tier layer, a pixel value for each green pixel in the second tier layer to the pixel maximum and the pixel minimum to determine if the pixel value for each green pixel in the second tier layer is within the range;

means for multiplying, for each green pixel in the second tier layer within the range, the pixel value of each green pixel by the second weighting factor to form a corresponding within-range weighted green pixel value;

means for multiplying, for each green pixel in the second tier layer out of the range, the center green pixel value by the second weighting factor to form a corresponding out-of-range weighted green pixel value; and wherein the summing means for the second tier layer sums the within-range weighted green pixel values for all green pixels in the second tier layer that are within the range, and sums the out-of-range weighted green pixel values for all green pixels in the second tier layer that are out of the range.

11. The module of claim 10; further comprising:

means for setting an upper bound Green mismatch F_max value comprising a ratio of Gr/Gb;

means for setting a lower bound Green mismatch F_min value comprising a second ratio of Gr/Gb;

means for calculating an offset adaptive to red pixel surrounding the center green pixel (CGP) to remove spatial variant green channel odd-even mismatch;

means for calculating the pixel maximum P_max based on an equation defined as $$P\_max = \max(F\_max * CGP, CGP + \text{offset}); \text{ and}$$

means for calculating the pixel minimum P_min based on an equation defined as $$P\_min = \min(F\_min * CGP, CGP - \text{offset}).$$

12. The module of claim 11; further comprising means for multiplying a mean of red pixel values for the red pixels surrounding each green pixel by a k parameter that adjusts a magnitude of correction for cross talk.

13. A method for adaptive green channel odd-even mismatch removal, the method comprising:
- dividing a raw image into a plurality of regions;
- generating, for each region of the plurality of regions, a weighted center green pixel value based on a first weighting factor for a center green pixel;
- applying a second weighting factor to green pixels that surround the center green pixel in a first tier layer;
- summing the green pixel values based on the second weighting factor to form a first tier layer sum;
- applying a third weighting factor to green pixels that surround the center green pixel in a second tier layer;
- summing the green pixel values based on the third weighting factor to form a second tier layer sum;
- summing the weighted center green pixel value, the first tier layer sum and the second tier layer sum to form a weighted green pixel sum total;
- normalizing the weighted green pixel sum total; and
- replacing a pixel value of the center green pixel with the normalized weighted green pixel sum total to remove the green channel odd-even mismatch.

14. The method of claim 13; further comprising multiplying the center green pixel value by the first weighting factor to generate the weighted center green pixel value.

15. The method of claim 14; further comprising,
prior to the summing step for the first tier layer,
- comparing a pixel value for each green pixel in the first tier layer to a pixel maximum and a pixel minimum to determine if the pixel value for each green pixel in the first tier layer is within a range;
- for each green pixel in the first tier layer within the range, multiplying the pixel value of a respective green pixel by the first weighting factor to form a corresponding within-range weighted green pixel value;
- for each green pixel in the first tier layer not within the range, multiplying the center green pixel value by the first weighting factor to form a corresponding out-of-range weighted green pixel value; and
- wherein summing the first tier layer includes summing the within-range weighted green pixel values for all green pixels in the first tier layer that are within the range, and summing the out-of-range weighted green pixel values for all green pixels in the first tier layer that are out of the range.

16. The method of claim 15; further comprising,
prior to the summing step for the second tier layer,
- comparing a pixel value for each green pixel in the second tier layer to the pixel maximum and the pixel minimum to determine if the pixel value for each green pixel in the second tier layer is within the range;
- for each green pixel in the second tier layer within the range, multiplying the pixel value of each green pixel by the second weighting factor to form a corresponding within-range weighted green pixel value; and
- for each green pixel in the second tier layer not within the range, multiplying the center green pixel value by the second weighting factor to form a corresponding out-of-range weighted green pixel value,
- wherein summing the second tier layer includes summing the within-range weighted green pixel values for all green pixels in the second tier layer that are within the range, and summing the out-of-range weighted green pixel values for all green pixels in the second tier layer that are out of the range.

17. The method of claim 15; further comprising
- setting an upper bound Green mismatch F_max value comprising a ratio of Gr/Gb;
- setting a lower bound Green mismatch F_min value comprising a second ratio of Gr/Gb;
- calculating an offset adaptive to red pixels surrounding the center green pixel (CGP) to remove spatial variant green channel odd-even mismatch;
- calculating the pixel maximum P_max based on an equation defined as $$P\_max = max(F\_max * CGP, CGP + offset); \text{ and}$$

- calculating the pixel minimum P_min based on an equation defined as $$P\_min = min(F\_min * CGP, CGP - offset).$$

18. The method of claim 17; further comprising multiplying a mean of red pixel values for red pixels surrounding each green pixel by a k parameter that adjusts a magnitude of correction for cross talk.

19. An adaptive green channel odd-even mismatch removal module comprising:
- means for dividing a raw image into a plurality of regions;
- means for generating, for each of the plurality of regions, a weighted center green pixel value based on a first weighting factor for a center green pixel;
- means for applying a second weighting factor to green pixels surrounding the center green pixel in a first tier layer;
- means for summing the green pixels weighted with the second weighting factor to form a first tier layer sum;
- means for applying a third weighting factor to green pixels surrounding the center green pixel in a second tier layer;
- means for summing the green pixels weighted with the third weighting factor to form a second tier layer sum;
- means for summing the weighted center green pixel value, the first tier layer sum and the second tier layer sum to form a weighted green pixel sum total;
- means for normalizing the weighted green pixel sum total; and
- means for replacing a pixel value of the center green pixel with the normalized weighted green pixel sum total.

20. The module of claim 19; further comprising means for multiplying the center green pixel value by the first weighting factor to generate the weighted center green pixel value.

21. The module of claim 19; further comprising:
- means for comparing a pixel value for each green pixel in the first tier layer to a pixel maximum and a pixel minimum to determine if the pixel value for each green pixel in the first tier layer is within a range;
- means for multiplying, for each green pixel in the first tier layer within the range, the pixel value of each green pixel by the first weighting factor to form a corresponding within-range weighted green pixel value;
- means for multiplying, for each green pixel in the first tier layer not within the range, the center green pixel value by the first weighting factor to form a corresponding out-of-range weighted green pixel value;
- wherein the summing means for the first tier layer sums the within-range weighted green pixel values for all green pixels in the first tier layer that are within the range and the out-of-range weighted green pixel values for all green pixels in the first tier layer that are out of the range.

22. The module of claim 21; further comprising,
- means for comparing, prior to summing the green pixels weighted with the second weighting factor of the second tier layer, a pixel value for each green pixel in the second tier layer to the pixel maximum and the pixel minimum to determine if the pixel value for each green pixel in the second tier layer is within the range;

means for multiplying, for each green pixel in the second tier layer within the range, the pixel value of each green pixel by the second weighting factor to form a corresponding within-range weighted green pixel value; and means for multiplying, for each green pixel in the second tier layer out of the range, the center green pixel value by the second weighting factor to form a corresponding out-of-range weighted green pixel value;

wherein the summing means for the second tier layer sums the within-range weighted green pixel values for all green pixels in the second tier layer that are within the range and sums the out-of-range weighted green pixel values for all green pixels in the second tier layer that are out of the range.

23. The module of claim 22; further comprising, means for setting an upper bound Green mismatch F_max value comprising a ratio of Gr/Gb;

means for setting a lower bound Green mismatch F_min value comprising a second ratio of Gr/Gb;

means for calculating an offset adaptive to red pixel surrounding the center green pixel (CGP) to remove spatial variant green channel odd-even mismatch;

means for calculating the pixel maximum P_max based on an equation defined as P_max=max(F_max*CGP, CGP+offset); and means for calculating the pixel minimum P_min based on an equation defined as P_min=min(F_min*CGP,CGP−offset).

24. The module of claim 23; further comprising means for multiplying a mean of red pixel values for red pixels surrounding each green pixel by a k parameter that adjusts a magnitude of correction for cross talk.

* * * * *